US010849036B2

(12) United States Patent
Ishikawa

(10) Patent No.: US 10,849,036 B2
(45) Date of Patent: Nov. 24, 2020

(54) INFORMATION PROCESSING APPARATUS CAPABLE OF EASILY IDENTIFY LINE TO BE USED, CONTROL METHOD THEREFOR, AND STORAGE MEDIUM

(71) Applicant: CANON KABUSHIKI KAISHA, Tokyo (JP)

(72) Inventor: Akira Ishikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/032,234

(22) Filed: Jul. 11, 2018

(65) Prior Publication Data

US 2019/0021035 A1 Jan. 17, 2019

(30) Foreign Application Priority Data

Jul. 14, 2017 (JP) ................................ 2017-137595

(51) Int. Cl.
*H04W 36/14* (2009.01)
*G06F 3/12* (2006.01)
(Continued)

(52) U.S. Cl.
CPC .......... *H04W 36/14* (2013.01); *G06F 3/1205* (2013.01); *H04L 61/2046* (2013.01);
(Continued)

(58) Field of Classification Search
CPC ............... G06F 3/1205; H04L 61/2046; H04L 29/12226; H04L 29/12264; H04L 61/2015;
(Continued)

(56) References Cited

U.S. PATENT DOCUMENTS 7,676,798 B2    3/2010  Snover
8,937,927 B1 *  1/2015  Pularikkal ......... H04W 36/0016
                                                   370/331
(Continued)

FOREIGN PATENT DOCUMENTS

JP   2003319461 A   11/2003
RU   2005115980 A   1/2006
RU      2536340 C2   12/2014

OTHER PUBLICATIONS

Extended European Search Report issued in European Appln. No. 18182838.5 dated Nov. 22, 2018.
(Continued)

*Primary Examiner* — Kan Yuen
(74) *Attorney, Agent, or Firm* — Rossi, Kimms & McDowell LLP

(57) ABSTRACT

An information processing apparatus which is able to identify a line to be used even if same address information is set for a plurality of lines. In the information processing apparatus, one of a wired I/F and a wireless I/F is used as a main line and the other is used as a sub line. Whether a network address of an IP address of the sub line overlaps with a network address of an IP address of the main line is determined. In a case where it is determined that the network address of the IP address of the sub line overlaps with the network address of the IP address of the main line, the sub line is disabled.

13 Claims, 17 Drawing Sheets

(51) Int. Cl.
    *H04W 80/04*     (2009.01)
    *H04W 88/10*     (2009.01)
    *H04L 29/12*     (2006.01)

(52) U.S. Cl.
    CPC ........... *H04W 80/04* (2013.01); *H04W 88/10* (2013.01); *H04N 2201/0094* (2013.01)

(58) Field of Classification Search
    CPC ......... H04N 2201/0094; H04W 36/14; H04W 80/04; H04W 88/10
    See application file for complete search history.

(56) References Cited

U.S. PATENT DOCUMENTS

| | | | |
|---|---|---|---|
| 9,480,092 B2 | 10/2016 | Horn et al. | |
| 2003/0046397 A1 | 3/2003 | Trace | |
| 2004/0266424 A1 | 12/2004 | Park et al. | |
| 2007/0064684 A1 | 3/2007 | Kottilingal | |
| 2010/0138546 A1* | 6/2010 | Dubs | H04L 29/12264 709/228 |
| 2011/0153815 A1 | 6/2011 | Aoki | |
| 2012/0131197 A1 | 5/2012 | Prentice et al. | |
| 2014/0085666 A1 | 3/2014 | Park | |
| 2014/0269507 A1 | 9/2014 | Tanji | |
| 2015/0195161 A1* | 7/2015 | Tanji | H04L 61/2046 709/224 |
| 2016/0253135 A1 | 9/2016 | Kubota | |

OTHER PUBLICATIONS

Extended European Search Report issued in European Appln. No. 18183333.6 dated Nov. 28, 2018.
"eth0 interfering with wlan0. pi networking" StackExchange. Unix & Linux. Retrieved Nov. 20, 2018. https://unix.stackexchange.com/questions/296498/eth0-interfering-with-wlan0-pi-networking. Cited in NPL 2.
Office Action issued in Russian Appln. No. 2018125459 dated May 13, 2019. English translation provided.
Copending U.S. Appl. No. 16/032,205, filed Jul. 11, 2018 (a copy is not included because the cited application is not yet available to the public and the Examiner has ready access to the cited application).
Office Action issued in U.S. Appl. No. 16/032,205 dated Nov. 6, 2019.
Office Action issued in European Appln. No. 18183333.6 dated Oct. 7, 2019.
Office Action issued in Russian Appln. No. 2018125454 dated Aug. 28, 2019. English translation provided.
Office Action issued in U.S. Appl. No. 16/032,205 dated May 15, 2020.

\* cited by examiner

FIG. 16

| CONDITION | MESSAGE |
|---|---|
| OVERLAP BETWEEN SUB LINE AND MAIN LINE | NETWORK ADDRESS OF SUB LINE OVERLAP WITH THAT OF MAIN LINE | ~1601
| OVERLAP BETWEEN WIRELESS DIRECT AND MAIN LINE | NETWORK ADDRESS FOR WIRELESS DIRECT OVERLAP WITH THAT OF MAIN LINE | ~1602
| OVERLAP BETWEEN WIRELESS DIRECT AND SUB LINE | NETWORK ADDRESS FOR WIRELESS DIRECT OVERLAP WITH THAT OF SUB LINE | ~1603

INFORMATION PROCESSING APPARATUS CAPABLE OF EASILY IDENTIFY LINE TO BE USED, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

Generally, a plurality of different networks is used in different ways in an office and so on in terms of securing a security quality and the like required for a network. An MFP as an information processing apparatus employed in an office has a plurality of lines, and the plurality of lines uses different networks, respectively. For example, the MFP uses a network by a line and uses another network different from the network by another line. In the MFP of this type, address information such as an IP address for accessing each line by a communication apparatus is set for the each line, and the address information of the each line is different from each other. The MFP identifies a line for performing communication with the communication apparatus from among the plurality of lines based on address information designated by the communication apparatus at a time of access (for example, see, Japanese Laid-Open Patent Publication (Kokai) No. 2003-319461).

However, when the same address information is set for the plurality of lines, the conventional MFP cannot discriminate each line based on the address information. As a result, the conventional MFP cannot identify a line for performing the communication with the communication apparatus from among the plurality of lines based on the address information designated by the communication apparatus at the time of access.

SUMMARY OF THE INVENTION

The present invention provides an information processing apparatus which is able to identify a line to be used even if same address information is set for a plurality of lines, a control method therefor, and a storage medium.

Accordingly, the present invention provides an information processing apparatus in which one of a wired IF and a wireless IF is used as a main line and the other is used as a sub line, comprising a determination unit configured to determine whether a network address of an IP address of the sub line overlaps with a network address of an IP address of the main line, and a control unit configured to disable the sub line in a case where it is determined that the network address of the IP address of the sub line overlaps with the network address of the IP address of the main line.

According to the present invention, the line to be used can be identified even if the same address information is set for the plurality of lines.

Further features of the present invention will become apparent from the following description of exemplary embodiments (with reference to the attached drawings).

BRIEF DESCRIPTION OF THE DRAWINGS

FIG. 16 is a view showing examples of messages displayed on the operating unit appearing in FIG. 1.

DESCRIPTION OF THE EMBODIMENTS

An embodiment of the present invention will now be described with reference to the accompanying drawings. In the present embodiment, a description will be given of a case where the present invention is applied to an MFP as an information processing apparatus, but the present invention may be applied not only to the MFP but to a communication apparatus such as a PC equipped with a plurality of liens.

Figure 1:
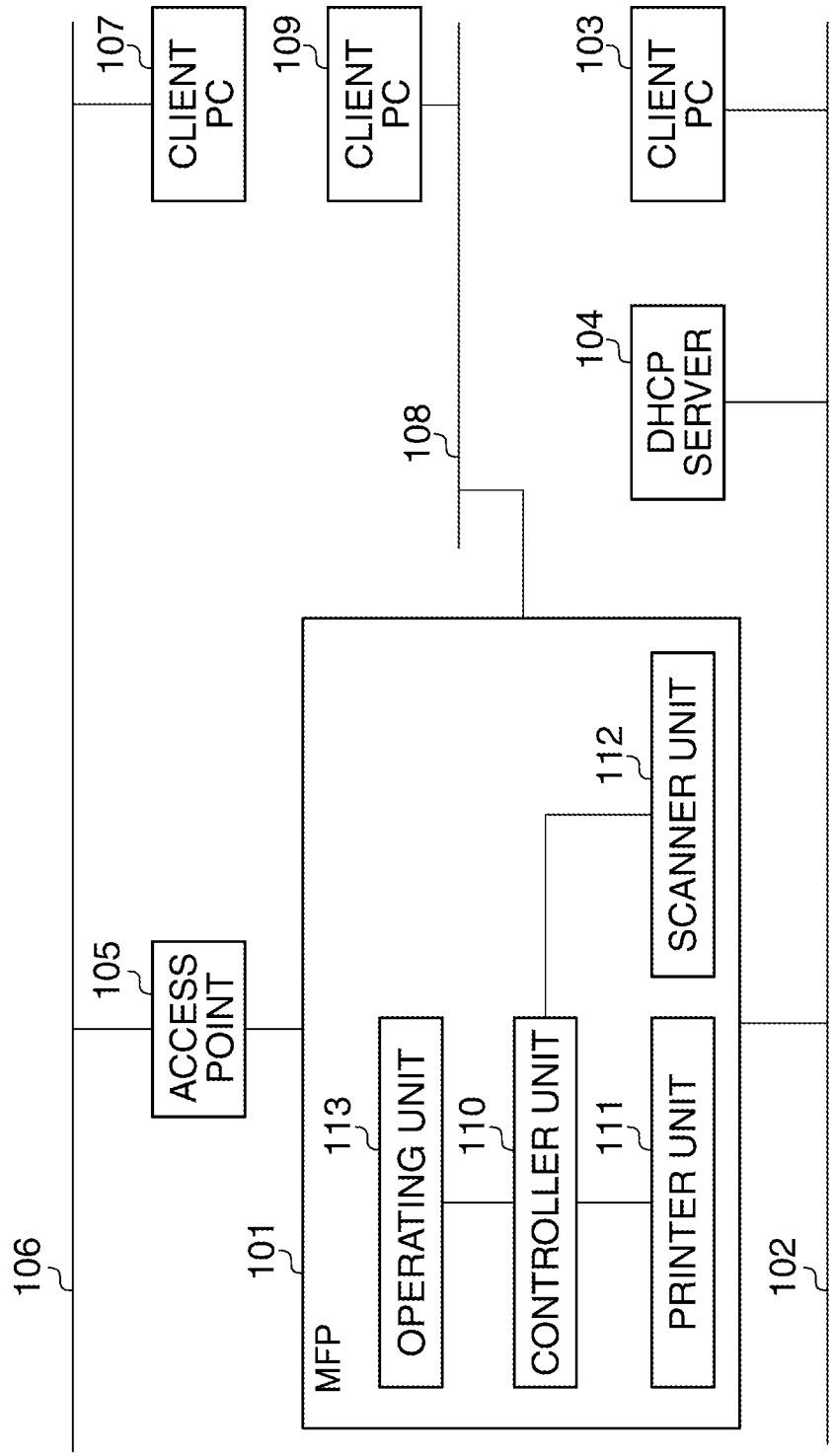
FIG. 1 is a block diagram schematically showing an arrangement of an MFP as an information processing apparatus according to an embodiment of the present invention.

FIG. 1 is a block diagram schematically showing an arrangement of the MFP 101 as an information processing apparatus according to the embodiment of the present invention.

In FIG. 1, the MFP 101 is connected with a client PC 103 and a DHCP (dynamic host configuration protocol) server 104 as communication apparatuses constituting a LAN 102 in a wired infrastructure by a wired cable, not shown. The MFP 101 performs wired LAN communication with the client PC 103 and the DHCP server 104. In the LAN 102, the DHCP server 104 allocates an IP address to each of the MFP 101 and the client PC 103. For example, the client PC 103 designates an IP address of the MFP 101 allocated by the DHCP server 104 to access to the MFP 101 and starts data communication with the MFP 101. The MFP 101 performs wireless LAN communication with a client PC 107 as a communication apparatus constituting a LAN 106 in a wireless infrastructure via an access point 105 communicatively connected to the MFP 101. Further, the MFP 101 itself functions as an access point and directly performs wireless communication with a client PC 109 as a communication apparatus constituting a LAN 108.

The MFP 101 has a plurality of lines, and in the present embodiment, an explanation will be given of an arrangement in which the MFP 101 has one main line and one sub line as an example. The MFP 101 is able to concurrently operate the wired infrastructure and the wireless infrastructure, and in this embodiment, one of the wired infrastructure and the wireless infrastructure is used as the main line, and the other is used as the sub line.

Next, an explanation will be given of the arrangement of the MFP 101. The MFP 101 has a controller unit 110, a printer unit 111, a scanner unit 112, and an operating unit 113, and the controller unit 110 is connected with the printer unit 111, the scanner unit 112, and the operating unit 113.

The controller unit 110 collectively controls overall operation of the MFP 101. The printer unit 111 performs printing on a sheet based on print data received from the communication apparatuses such as the client PCs 103, 107, and 109. The scanner unit 112 scans an original and generates image data. The operating unit 113 has a display unit and a plurality of operation keys, not shown. For example, the operating unit 113 displays an operation screen for configuring settings on the MFP 101 on the display unit and receives an instruction input by a user operating the operation keys.

Figure 2:
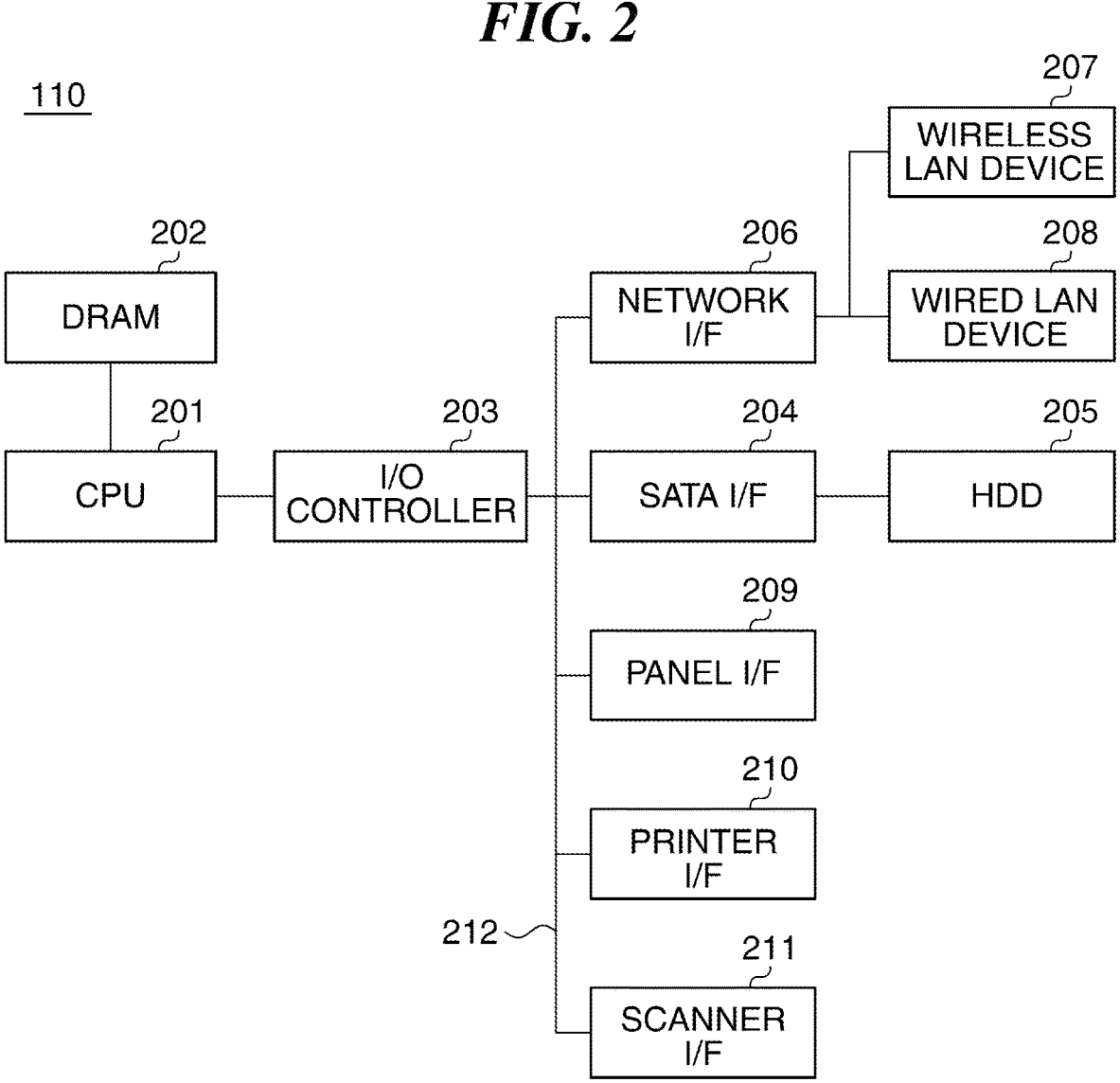
FIG. 2 is a block diagram schematically showing an arrangement of a controller unit appearing in FIG. 1.

FIG. 2 is a block diagram schematically showing an arrangement of the controller unit 110 appearing in FIG. 1.

In FIG. 2, the controller unit 110 has a CPU 201, a DRAM 202, an I/O controller 202, a SATA I/F 204, an HDD 205, a network I/F 206, a wired LAN device 207, and a wireless LAN device 208. The controller unit 110 also has a panel I/F 209, a printer I/F 210, and a scanner I/F 211. The CPU 201 is connected with the DRAM 202 and the I/O controller 203. The I/O controller 203, the SATA I/F 204, the network I/F 206, the panel I/F 209, the printer I/F 210, and the scanner I/F 211 are connected with one another via a bus 212. The SATA I/F 204 is connected with the HDD 205. The network I/F 206 is connected with the wired LAN device 207 and the wireless LAN device 208.

The CPU 201 carries out a computation process for performing various controls in the controller unit 110 and transmits various control instructions to the I/O controller 203. The DRAM 202 is used as a work area for the CPU 201 and as a temporal storage area of various types of data. The I/O controller 203 transfers a control instruction by the CPU 201 to component elements connected via the bus 212. The SATA I/F 204 performs control to write data in the HDD 205 and performs controls to read out data stored in the HDD 205 in accordance with the control instruction by the CPU 201. The HDD 205 stores programs for implementing functions of the MFP 101, image data, and the like.

The network I/F 206 controls each of the wired LAN device 207 and the wireless LAN device 208 in accordance with the control instruction by the CPU 201. The wired LAN device 207 controls wired LAN communication performed with the client PC 103 and the like constituting the LAN 102 in the wired infrastructure. The wireless LAN device 208 has a wireless infrastructure mode and a wireless access point mode. In the wireless infrastructure mode, wireless LAN communication is performed via the client PC 107 and the access point 105 constituting the LAN 106 in the wireless infrastructure. In the wireless access point mode, the MFP 101 functions as an access point and directly performs the wireless communication with the client PC 109 constituting the LAN 108. Hereinafter, the wireless communication in the wireless access point mode is defined as "a Wireless Direct".

The panel I/F 209 performs display control in the operating unit 113 in accordance with the control instruction by the CPU 201 and transfers a content input by the user operating the operating unit 113 to the CPU 201. The printer I/F 210 causes the printer unit 111 to carry out a printing process in accordance with the control instruction by the CPU 201. The scanner I/F 211 causes the scanner unit 112 to carry out a scanning process in accordance with the control instruction by the CPU 201.

Figure 3:
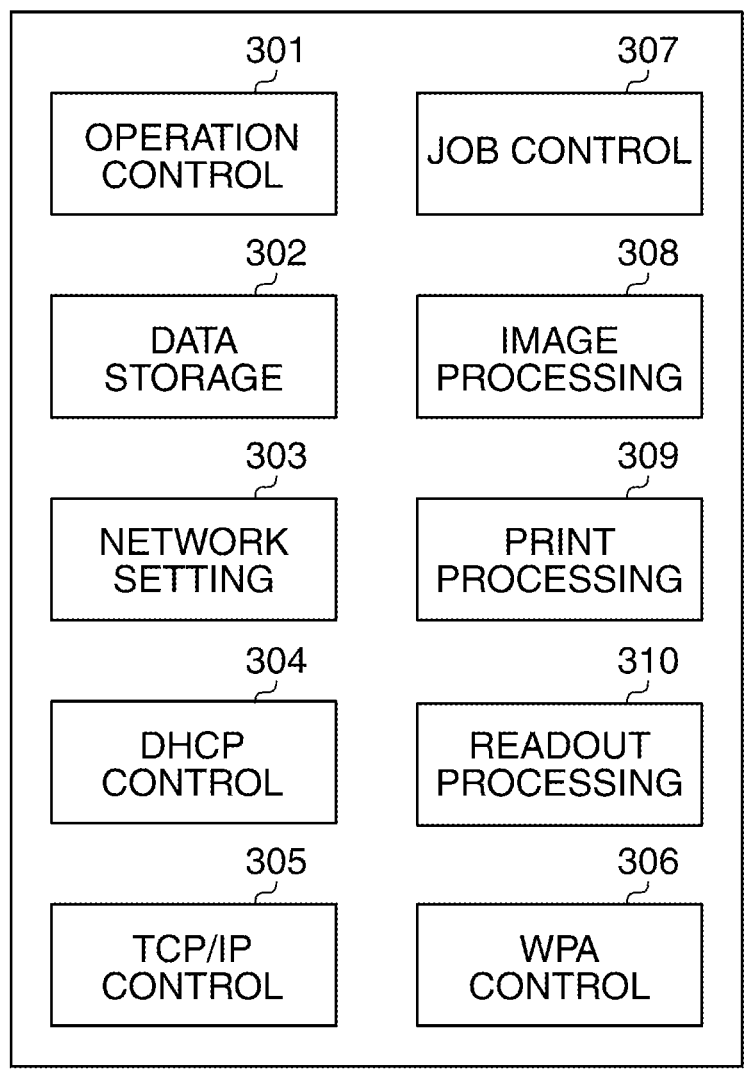
FIG. 3 is a block diagram schematically showing an arrangement of software modules controlled by the controller unit appearing in FIG. 1.

FIG. 3 is a block diagram schematically showing an arrangement of software modules controlled by the controller unit 110 appearing in FIG. 1.

In FIG. 3, the MFP 101 has an operation control module 301, a data storage module 302, a network setting module 303, a DHCP control module 304, and a TCP/IP control module 305. The MFP 101 also has a WPA (Wi-Fi protected access) control module 306, a job control module 307, an image processing module 308, a print processing module 309, and a readout processing module 310. Controls on the above-described modules are performed by the CPU 201 implementing programs stored in the HDD 205.

The operation control module 301 performs display control on the display screen and the like in the operating unit 113 and receives operations by the user on the operation screen and the operation keys. The data storage module 302 performs controls to write data such as a setting value into the HDD 205 and read out data stored in the HDD 205. The network setting module 303 performs control on network settings of the MFP 101 and requests the DHCP control module 304 and the WPA control module 306 and the like to carry out processing. For example, when the user configures a setting to use the IP address allocated by the DHCP server 104 as address information of the MFP 101, the network setting module 303 requests the DHCP control module 304 to carry out the following processing. The DHCP control module 304 controls a process of allocating an IP address in accordance with a protocol defined as a DHCP by RFC 2131. The TCP/IP control module 305 carries out a process of sending/receiving a network packet. When receiving a request from the network setting module 303, the WPA control module 306 carries out a wireless access authentication process in accordance with a predetermined encryption method, for example, a WPA protocol. It should be note that although in the present embodiment, an explanation will be given of a case where a WPA-PSK encryption method is used when the wireless LAN communication is performed, the encryption method is not limited to this. For example, the encryption method may be a WEP, WPA-EAP or the like, and the encryption method may not be used in the wireless LAN communication.

The job control module 307 performs control on execution of a job and issues an execution instruction relating to a job with respect to the image processing module 308, the print processing module 309 and the readout processing module 310. Upon receiving the execution instruction from the job control module 307, the image processing module 308 carries out image processing such as processing of image data into data formats suitable for respective usages. Upon receiving the execution instruction from the job control module 307, the print processing module 309 controls the printer unit 111 to carry out the printing process. Upon receiving the execution instruction from the job control module 307, the readout processing module 310 controls the scanner unit 112 to carry out the scanning process.

Figure 4:
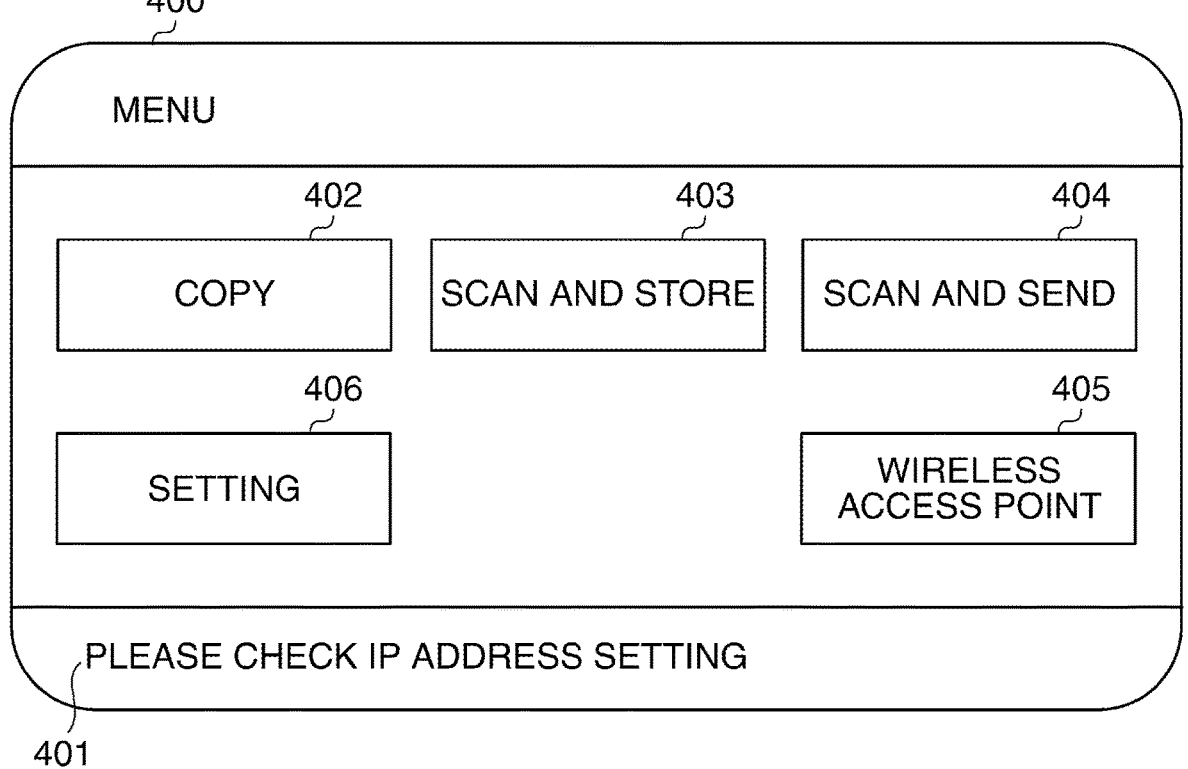
FIG. 4 is a view showing an example of a menu screen displayed on an operating unit appearing in FIG. 1.

Next, an explanation will be given of a menu screen 400 in FIG. 4 displayed on the operating unit 113. The menu screen 400 is an operation screen for the user to select functions of the MFP 101. The menu screen 400 has an information notifying area 401, a copy button 402, a scan and store button 403, a scan and send button 404, a wireless access point button 405, and a setting button 406. In the information notifying area 401, a notification to the user is displayed. The copy button 402 is selected when the user uses the copying function. The scan and store button 403 is selected when the user uses a function to store image data obtained by the MFP 101 performing scanning. The scan and send button 404 is selected when the user uses a function to send the image data obtained by the MFP 101 performing scanning to the communication apparatus. The wireless access point button 405 is selected when the MFP 101 is to sifted into the wireless access point mode. The wireless access point button 405 is displayed on the menu screen 400 when a wireless access point mode enabling setting 1301 in FIG. 13, to be described later, is set to ON. When the user selects the wireless access point button 405, a start setting screen 500 in FIG. 5A, to be described later, is displayed on the operating unit 113. The setting button 406 is selected when the user changes settings on the MFP 101. When the user selects the setting button 406 in the menu screen 400, a setting screen 600 in FIG. 6, to be described later, is displayed on the operating unit 113.

Figure 5A:
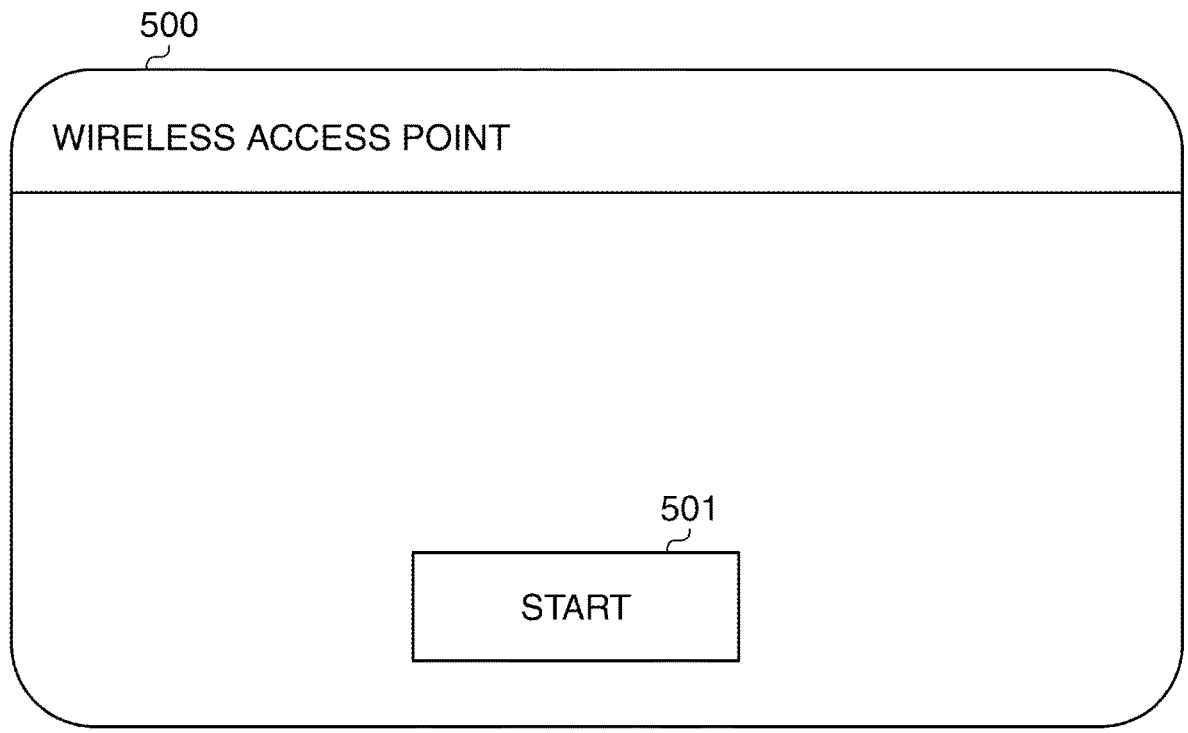
FIGS. 5A and 5B are views showing examples of screens for instructing start and end of a wireless access point mode in the MFP appearing in FIG. 1.

The start setting screen 500 in FIG. 5A is a setting screen for instructing start of the Wireless Direct. When a user selects a start button 501 in the start setting screen 500, an instruction to start shifting to the wireless access point mode is issued to the network setting module 303. As a result, the MFP 101 operates as an access point and becomes ready to start the Wireless Direct with the client PC 109 and the like. Namely, in the present embodiment, the user can instruct to start shifting to the wireless access point mode by an easy operation of merely selecting the wireless access point button 405 in the menu screen 400 and selecting the start button 501 in the start setting screen 500.

Figure 5B:
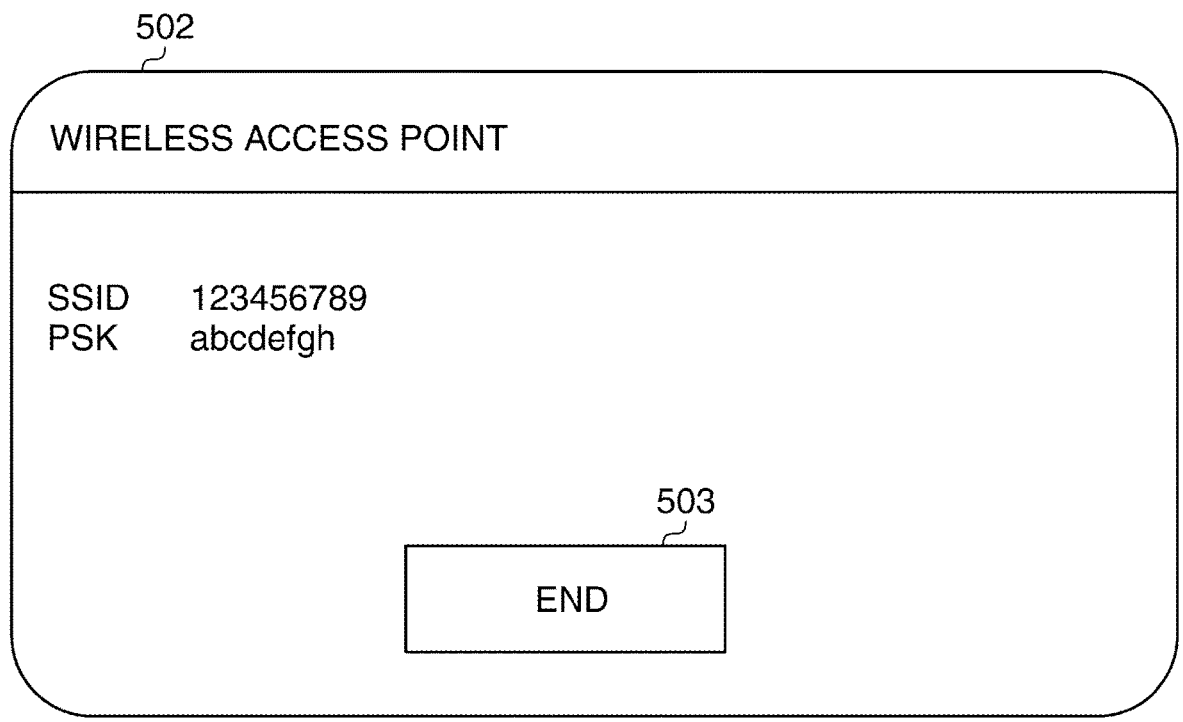

When the user selects the start button 501, a setting information screen 502 in FIG. 5B is displayed on the operating unit 113. In the setting information screen 502, setting information such as an SSID, PSK, or the like required for communicatively connecting the client PC 109 and the like with the MFP 101 as the access point. When the user selects an end button 503 in the setting information screen 502, an instruction to end the wireless access point mode is issued to the network setting module 303. As a result, the MFP 101 ends the Wireless Direct with the client PC 109.

Figure 6:
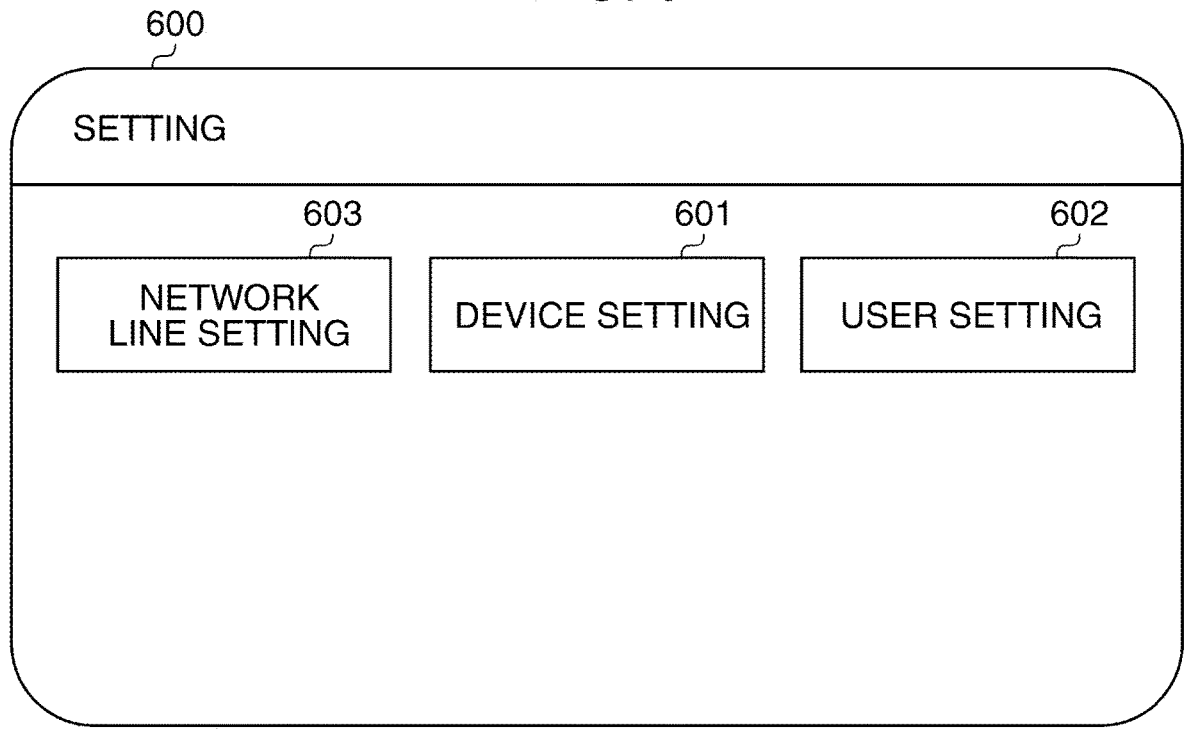
FIG. 6 is a view showing an example of a setting screen displayed on the operating unit appearing in FIG. 1.

The setting screen 600 in FIG. 6 is an operation screen for guiding the user to a setting screen for configuring detailed information of each setting and has a device setting button 601, a user setting button 602, and a network line setting button 603. The device setting button 601 is an operation button for displaying a device setting screen, not shown, for configuring setting on devices of the MFP 101. The user setting button 602 is an operation button for displaying a user setting screen, not shown, for configuring settings on users of the MFP 101. The network line setting button 603 is an operation button for displaying a network setting screen in FIG. 7 for configuring network settings on the MFP 101.

Figure 7:
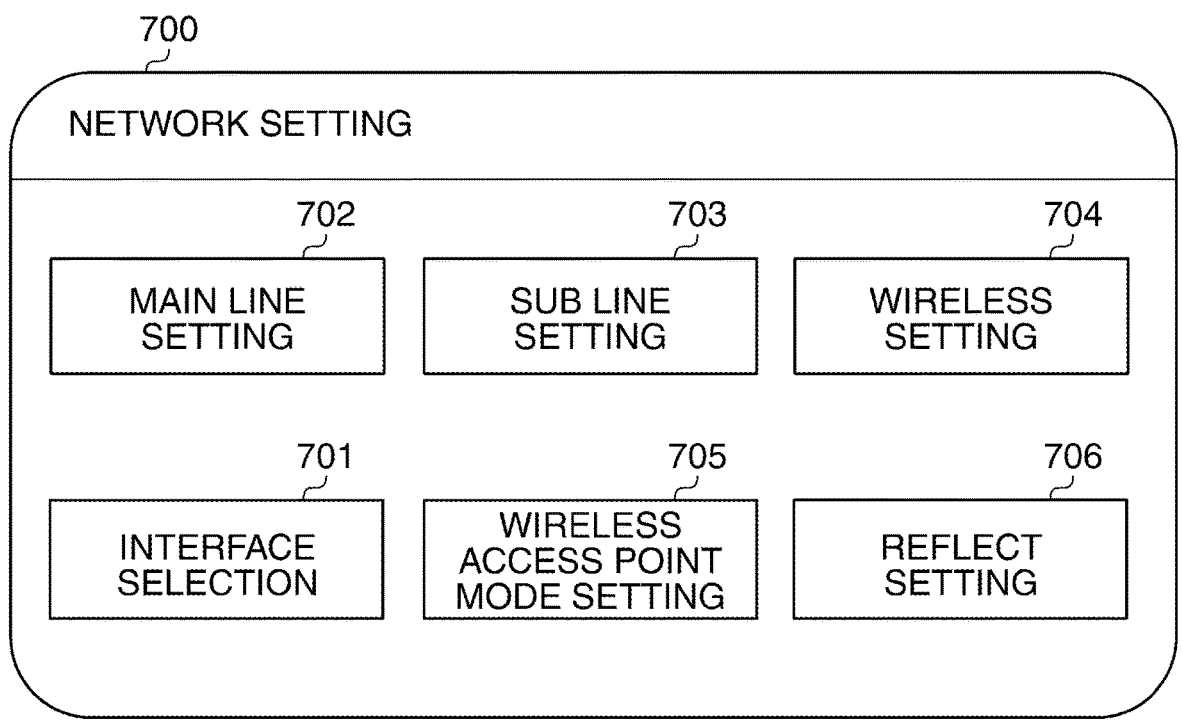
FIG. 7 is a view showing an example of a network setting screen displayed on the operating unit appearing in FIG. 1.

The network setting screen 700 in FIG. 7 is an operation screen for guiding the user to a setting screen for configuring a setting on detailed information of the network settings. The network setting screen 700 has an interface selection button 701, a main line setting button 702, a sub line setting button 703, a wireless setting button 704, a wireless access point setting button 705, and a setting reflection button 706. The interface selection button 701 is an operation button for displaying an interface selection screen 800 in FIG. 8, to be described later. The main line setting button 702 is an operation button for displaying a main line setting screen 900 in FIG. 9, to be described later. The sub line setting button 703 is an operation button for displaying a sub line setting screen 1000 in FIG. 10, to be described later. The wireless setting button 704 is an operation button for displaying a wireless setting screen 1100 in FIG. 11, to be described later. The wireless access point setting button 705 is an operation button for displaying a wireless access point setting screen 1300 in FIG. 13, to be described later. The setting reflection button 706 is an operation button for storing a setting value set by the user in the HDD 205 and instructing reflection of the settings to the network setting module 303.

Figure 8:
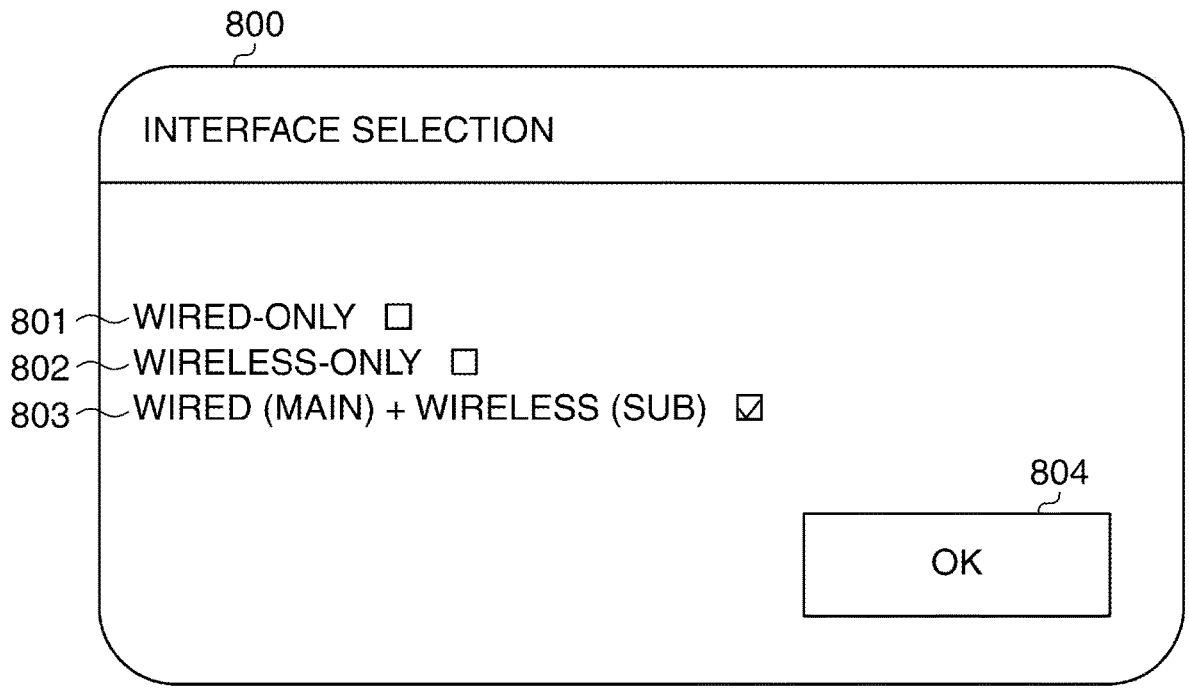
FIG. 8 is a view showing an example of an interface selection screen displayed on the operating unit appearing in FIG. 1.

The interface selection screen 800 in FIG. 8 is a setting screen for configuring a setting on the wired infrastructure and the wireless infrastructure in the MFP 101. Settings in the interface selection screen 800 are to be configured by an administrator or the like of the MFP 101, and the settings are not changed frequently. When wired-only 801 is set to ON, the MFP 101 uses the wired infrastructure only. When wireless-only 802 is set to ON, the MFP 101 uses the wireless infrastructure only. When wired (main)+wireless (sub) 803 is set to ON, the MFP 101 uses the wired infrastructure as a main line and uses the wireless infrastructure as a sub line. In the interface selection screen 800, only one of the wired-only 801, the wireless-only 802, and the wired (main)+wireless (sub) 803 can be set to ON. When an OK button 804 is selected, a setting value set in the interface selection screen 800 is stored in the DD 205. It should be noted that in the present embodiment, the setting on the wireless infrastructure is not associated with the setting on the Wireless Direct, and the setting value set in the interface selection screen 800 does not affects the setting on the Wireless Direct.

Figure 9:
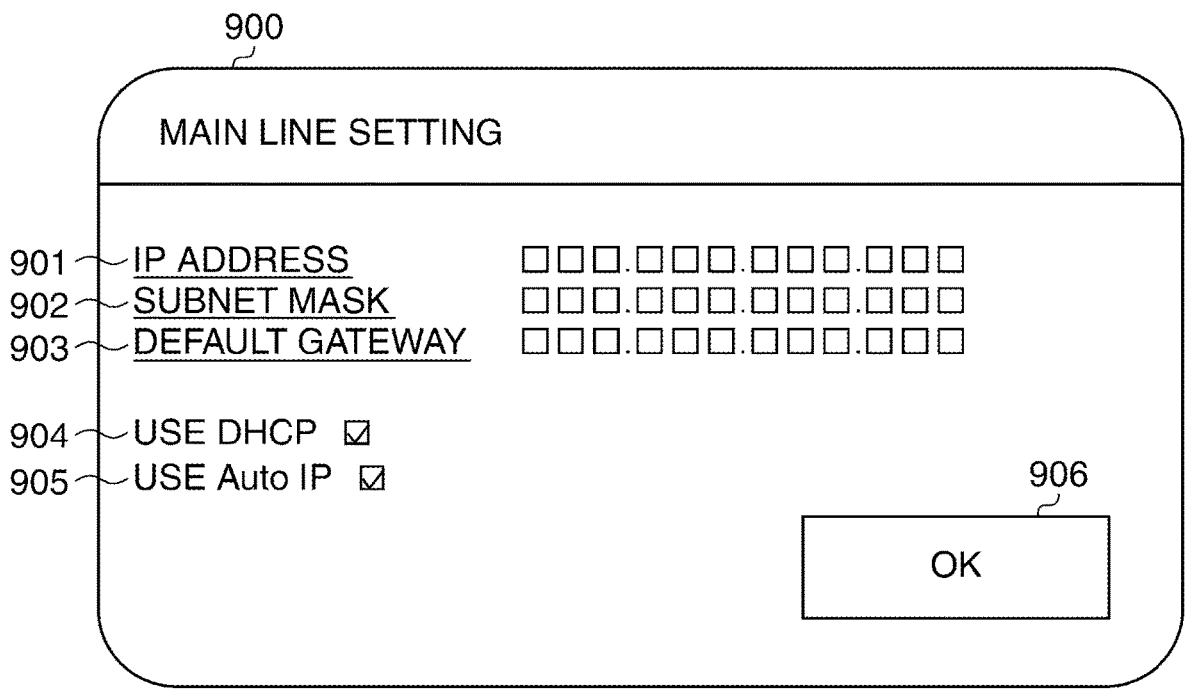
FIG. 9 is a view showing an example of a main line setting screen displayed on the operating unit appearing in FIG. 1.

The main line setting screen 900 in FIG. 9 is an operation screen for setting address information of the main line of the MFP 101. To an IP address input section 901, a subnet mask input section 902, and a default gateway input section 903, the user is able to input an arbitral IP address, subnet mask, and default gateway, respectively. When a DHCP selection section 904 is set ON, a setting to obtain an IP address included in the address information of the main line from the DHCP server on the main line network is configured. When an Auto IP (automatic private IP addressing) selection section 905 is set to ON, a setting to determine an IP address included in the address information of the main line by an Auto IP protocol is configured. When an OK button 906 is selected, the setting values set in the main line setting screen 900 are stored in the HDD 205.

Figure 10:
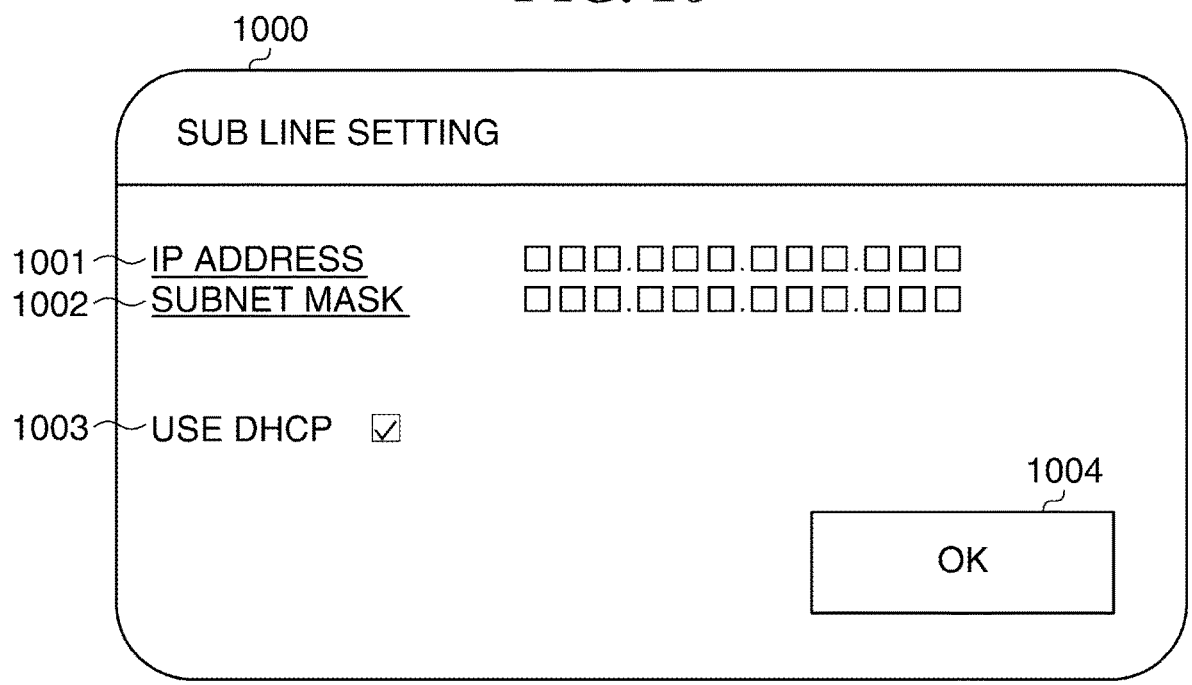
FIG. 10 is a view showing an example of a sub line setting screen displayed on the operating unit appearing in FIG. 1.

The sub line setting screen 1000 in FIG. 10 is an operation screen for setting address information of the sub line of the MFP 101. The user is able to input arbitral IP address and subnet mask in an IP address input section 1001 and a subnet mask input section 1002. When a DHCP selection section 1003 is set to ON, a setting to obtain an IP address included in the address information of the sub line from the DHCP server on the network of the subline is configured. When an OK button 1004 is selected, setting values set in the sub line setting screen 1000 are stored in the HDD 205. It should be noted that in the present embodiment, in order to concurrently use the plurality of lines, a part of functions on the sub line side is limited; for example, the sub line cannot use a default gateway and an Auto IP. For this reason, in the present embodiment, the sub line is used, for example, as a line with which communication is performed within a network set in advance. On the other hand, the main line is used as a line with which communication is performed via a plurality of networks including an external network by using the default gateway other than the network set in advance. The sub line setting screen 1000 does not have a setting item for using the default gateway and the Auto IP. Besides, functions such as DNS, 802.1x, IPsec, IP filter, port filter, MAC address filter, SMB, HTTP, WebDAV, and FTP cannot be used on the subline side.

Figure 11:
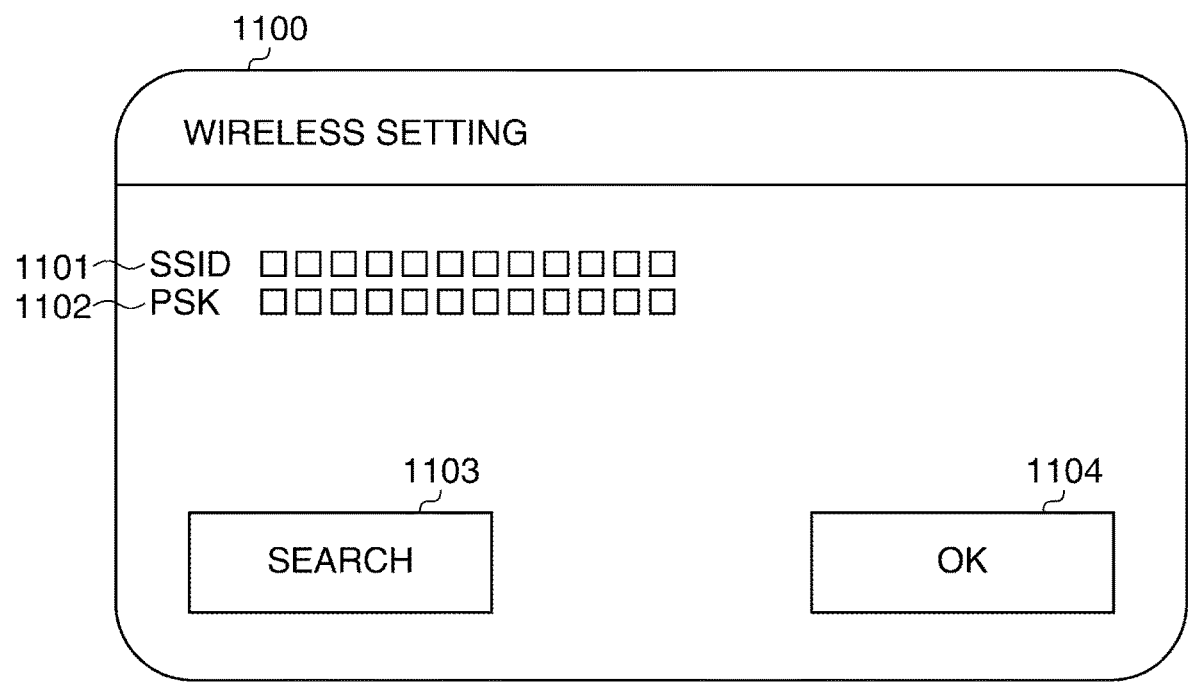
FIG. 11 is a view showing an example of a wireless setting screen displayed on the operating unit appearing in FIG. 1.

The wireless setting screen 1100 in FIG. 11 is an operation screen for configuring a authentication setting in the wireless infrastructure mode. An SSID of an access point to which the user wish to access and a key corresponding to the SSID is input to an SSID input section 1101 and a PSK input section 1102, respectively. When a search button 1103 is selected, an access point selection screen 1200 in FIG. 12 for selecting an access point is displayed on the operating unit 113. When an OK button 1104 is selected, setting values set in the wireless setting screen 1100 are stored in the HDD 205.

Figure 12:
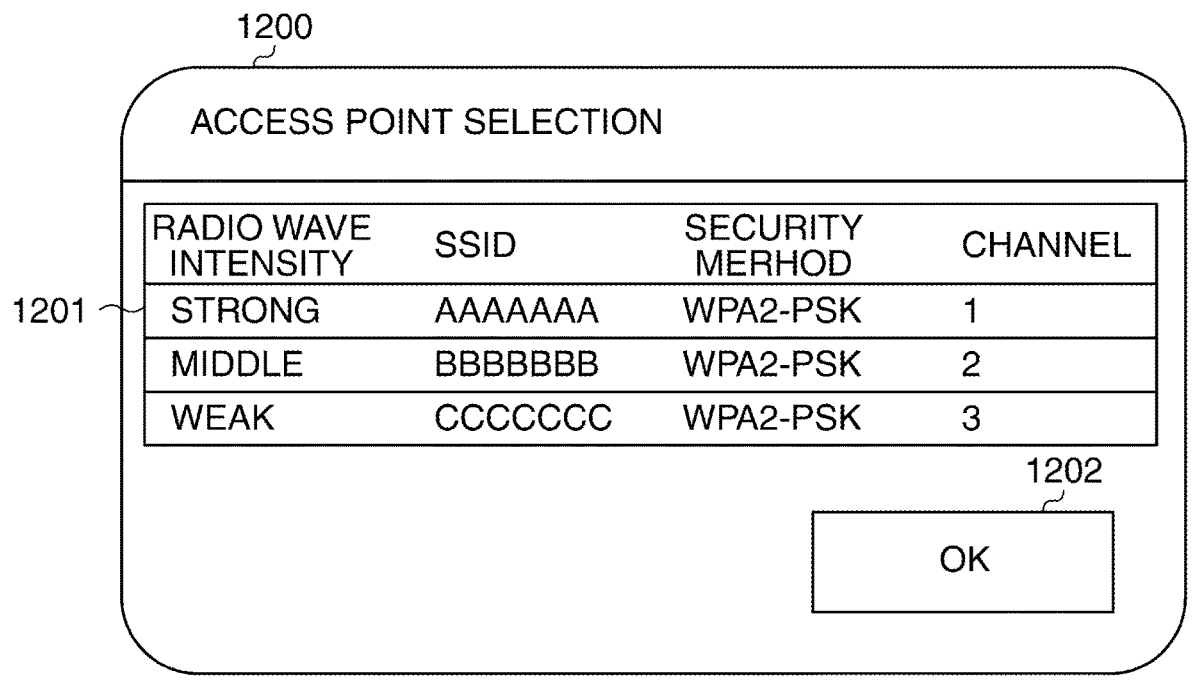
FIG. 12 is a view showing an example of an access point selection screen displayed on the operating unit appearing in FIG. 1.

The access point selection screen 1200 in FIG. 12 is an operation screen for setting an access point to be used by the MFP 101. A list of access points which can be used by the MFP 101 is displayed on a search result display section 1201. When the access point 105, for example, is selected from the list of the access points displayed on the search result display section 1201, and information indicative of the access point 105 is stored in the HDD 205. Thereafter, the wireless setting screen 1100 with the SSID of the access point 105 is set in the SSID input unit 101 is then displayed on the operating unit 113.

Figure 13:
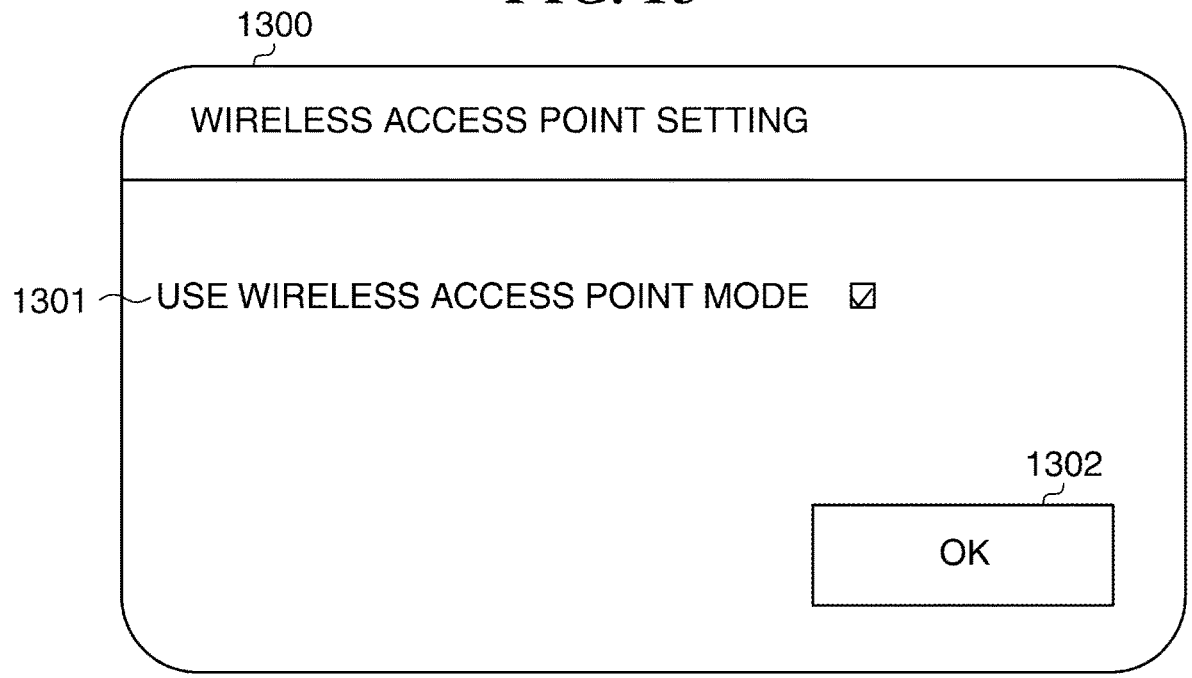
FIG. 13 is a view showing an example of a wireless access point setting screen displayed on the operating unit appearing in FIG. 1.

An wireless access point setting screen 1300 in FIG. 13 is a setting screen for configuring a setting on the wireless access point mode. The settings in the wireless access point setting screen 1300 are also configured by the administrator of the MFP 101 and are not frequently changed. When a wireless access point mode enabling setting 1301 is set to ON, the wireless access point mode of the MFP 101 is enabled. The menu screen 400 displayed on the operating unit 113 with the wireless access point mode enabled includes the wireless access point button 405 for displaying the start setting screen 500 for instructing shifting to the wireless access point mode. On the other hand, when the wireless access point mode enabling setting 1301 is set to OFF, the wireless access point mode of the MFP 101 is disabled. The menu screen 400 displayed on the operating unit 113 with the wireless access point mode disabled does not include the wireless access point button 405. When an OK button 1302 is selected, setting values set in the wireless access point setting screen 1300 are stored in the HDD 205, and a screen on the operating unit 113 is switched to the network setting screen 700.

Next, a description will be given of a process regarding a setting on the address information of the MFP 101.

Figure 14:
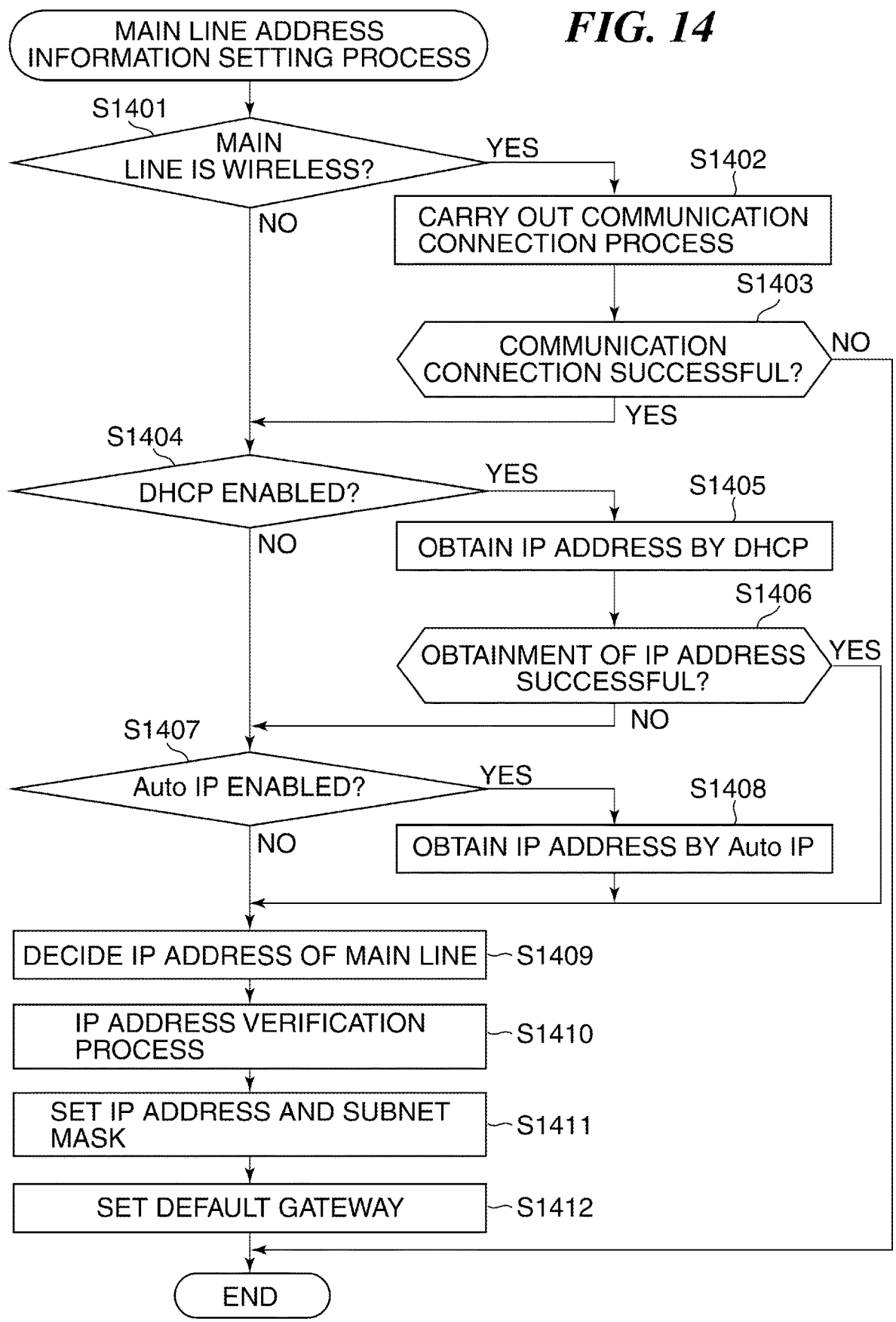
FIG. 14 is a flowchart showing a procedure of a main line address information setting process carried out by a network setting module appearing in FIG. 3.

FIG. 14 is a flowchart showing a procedure of an address information setting process for the main line carried out by the network setting module 303 appearing in FIG. 3.

The process in FIG. 14 is carried out by the CPU 201 implementing a program stored in the HDD 205. The process in FIG. 14 is also carried out when a system of the MFP 101 is started or when the setting reflection button 706 in the network setting screen 700 is selected. Moreover, the process in FIG. 14 is carried out on an assumption that at least the settings on the screens in FIGS. 8, 9 and 11 are already configured.

In FIG. 14, at first, the network setting module 303 determines whether the main line is wireless (step S1401). In step S1401, when the setting value indicative of the "wireless-only 802" is stored in the HDD 205, the network setting module 303 determines that the main line is wireless. on the other hand, when the setting value indicative of either of the "wired-only 801" or "wired (main)+wireless (sub) 803" is stored in the HDD 205, the network setting module 303 determines that the main line is not wireless.

As a result of determination in step S1401, when the main line is wireless, the network setting module 303 carries out a communication connecting process with an access point set on the wireless setting screen 1100, for example, the access point 105 (step S1402). In the above communication connecting process, the network setting module 303 requests the WPA control module 306 to carry out the process. Accordingly, the WPA control module 306 obtains an SSID and a PSK of the access point 105 from the data storage module 320 and transmits an authentication request generated based on the obtained PSK to the access point 105. The WPA control module 306 receives a determination result as to connection possible/impossible from the access point 105. The network setting module 303 then determines whether the communication connection with the access point 105 was successful (step S1403). In step S1403, when the received determination result indicates connection possible, the network setting module 303 determines that the communication connection with the access point 105 was successful. On the other hand, the received determination result indicates connection impossible, the network setting module 303 determines that the communication connection with the access point 105 was unsuccessful.

As a result of the determination in step 1403, when the communication connection with the access point 105 was unsuccessful, the network setting module 303 terminates the present process.

When the main line is not wireless as a result of the determination in step S1401 or when the communication connection with the access point 105 was successful as a result of the determination in step S1403, the network setting module 303 determines whether the DHCP is enabled (step S1404). In step S1404, when a setting value indicating that the DHCP selection section 904 is ON is stored in the HDD 205, the network setting module 303 determines that the DHCP is enabled. On the other hand, when a setting value indicating that the DHCP selection section 904 is OFF, the network setting module 303 determines that the DHCP is disabled.

As a result of the determination in step S1404, when the DHCP is enabled, the network setting module 303 obtains an IP address by the DHCP (step S1405). In step S1405, the network setting module 303 requests the DHCP control module 304 to carry out the process. Accordingly, the DHCP module 304 searches the DHCP server on the network of the main line of the MFP 101 in accordance with the DHCP protocol. The DHCP control module 304 obtains an IP address allocated by the searched DHCP server and registers usage of the obtained IP address to the DHCP server. The network setting module 303 then determines whether the obtainment of the IP address by the DHCP was successful (step S1406).

As a result of the determination in step S1406, when the obtainment of the IP address by the DHCP was successful, the network setting module 303 carries out a process in step S1409, to be described later.

When the DHCP is disabled as a result of the determination is step S1404 or when the obtainment of the IP address by the DHCP was unsuccessful as a result of the determination in step S1406, the network setting module 303 determines whether an Auto IP is enabled (step S1407). In step S1407, when a setting value indicating that the Auto IP selection section 905 is ON is stored in the HDD 205, the network setting module 303 determines that the Auto IP is enabled. On the other hand, when a setting value indicating that the Auto IP selection section 905 is OFF is stored in the HDD 205, the network setting module 303 determines that the Auto IP is disabled.

As a result of the determination in step S1407, when the Auto IP is enabled, the network setting module 303 obtains an IP address by the Auto IP (step S1408). In step S1408, the network setting module 303 carries out a selection process in which it selects in a random manner one IP address from an IP address range prescribed in advance for the Auto IP. The network setting module 303 also carries out a confirmation process in which it confirms that no communication apparatus to which the IP address is set exists on the network of the main line by using the ARP protocol. When a communication apparatus to which the IP address is set exists on the network of the main line, the network setting module 303 repeats the above selection process and the above confirmation process until an IP address which is not used by all communication apparatus on the network of the main lime. The network setting module 303 then decides the address information of the main line of the MFP 101 (step 1409).

For example, when the DHCP is enabled, the network setting module 303 decides the IP address obtained by the searched DHCP server, a subnet mask corresponding to the IP address, and the default gateway as the address information of the main line. When the DHCP is enabled, the obtainment of the IP address from the DHCP server was unsuccessful, and the Auto IP is enabled, or when the DHCP is disabled and the Auto IP is enabled, the network setting module 303 decides that the IP address obtained by the Auto IP, a subnet mask corresponding to the IP address, and the default gateway as the address information of the main line. When the DHCP is enabled, the obtainment of the IP address from the DHCP server was unsuccessful, and the Auto IP is disabled, the network setting module 303 decides a disabled address (0. 0. 0. 0), a subnet mask corresponding to the disabled address, and the default gateway as the address information of the main line. When both of the DHCP and the Auto IP are disabled, the network setting module 303 decides the setting values input to the IP address input section 901, the subnet mask input section 902, and the default gateway input section 903 as the address information of the main line.

The network setting module 303 then verifies the IP address of the decided address information (step S1410). As a result of the verification, when the IP address is a disabled IP address, a message and the like which prompts the user to confirm an IP address on the operating unit 113. The network setting module 303 then sets the IP address and the subnet mask of the decided address information to the TCP/IP control module 305 (step S1411). The network setting module 303 then sets the default gateway of the decided address information to the TCP/IP control module 305 (step S1412) and terminates the present process.

Figure 15:
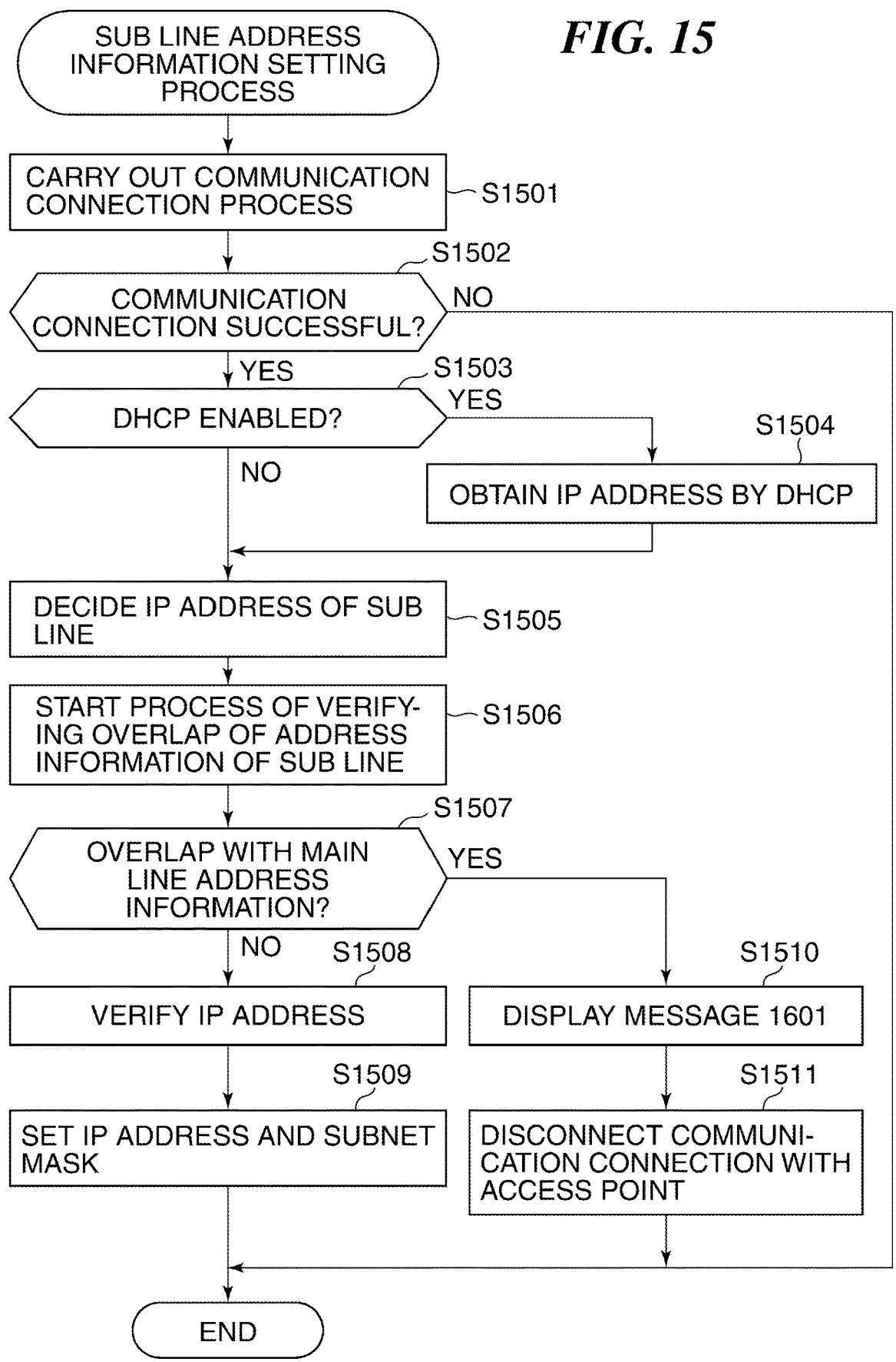
FIG. 15 is a flowchart showing a procedure of a sub line address information setting process carried out by the network setting module appearing in FIG. 3.

FIG. 15 is a flowchart showing a procedure of a sub line address information setting process carried out by the network setting module 303 appearing in FIG. 3.

The process of FIG. 15 is carried out by the CPU 201 implementing a program stored in the HDD 205, and carried out when the setting value indicative of the "wired (main)+ wireless (sub) 803" was selected is store in the HDD 205, and the process in FIG. 14 was completed.

In FIG. 15, the network setting module 303 carries out the above described communication connection process with an access point set on the wireless setting screen 1100, for example, the access point 105 (step S1501). The network setting module 303 then determines whether the communication connection with the access point 105 was successful (step S1502).

As a result of the determination in step S1502, when the communication connection with the access point 105 was unsuccessful, the network setting module 303 terminates the present process. On the other hand, as a result of the determination in step S1702, when the communication connection with the access point 105 was successful, the network setting module 303 determines whether the DHCP is enabled based on the setting value set for the DHCP selection section 904 stored in the HDD 205 (step S1503).

As a result of the determination in step S1503, when the DHCP is enabled, the network setting module 303 obtains an IP address by the DHCP (step S1504). The network setting module 303 accesses to the DHCP server on the network of the sub line and obtains the IP address from the DHCP server. The network setting module 303 then decides the address information of the sub line of the MFP 101 (step S1505). In step S1505, when the obtainment of the IP address by the DHCP was successful, the network setting module 303 decides the obtained IP address and a subnet mask corresponding to the IP address as the address information of the sub line. On the other hand, when the obtainment of the IP address was unsuccessful, the network setting module 303 decides a disabled address (0. 0. 0. 0) and a subnet mask corresponding to the disabled address as the address information of the sub line.

As a result of the determination in step S1503, when the DHCP is disabled, the network setting module 303 carries out a process in step S1505. At this time, the network setting module 303 decides setting values input in the IP address input section 1001 and the subnet mask input unit 1002 as the address information of the sub line. The network setting module 303 then starts a process of verifying overlap of decided address information of the sub line (step 1506), and determines whether the address information of the sub line overlaps with the address information of the main line (step S1507). In step S1507, for example, when a sub line network address identified based on the IP address and the subnet mask in the address information of the sub line matches with a main line network address identified based on the IP address and the subnet mask in the address information of the main line, the network setting module 303 determines that the decided the address information of the sub line overlaps with the address information of the main line. On the other hand, when the sub line network address and the main line network address do not match, the network setting module 303 determines that the decided address information of the sub line does not overlap with the address information of the main line. It should be noted that in the present embodiment, when the network addresses partly match with each other, for example, when one network address is included in the other network address, the network setting module 303 may determine that the decided address information of the sub line overlaps with the address information of the main line even if the sub line network address does not completely match the main line network address.

As a result of the determination in step S1507, when the decided address information of the sub line does not overlap with the address information of the main line, the network setting module 303 verifies the IP address in the decided address information of the sub line (step S1508). The network setting module 303 then sets the IP address and the subnet mask in the decided address information of the sub line to the TCP/IP control module 305 (step S1509), and terminates the present process.

As a result of the determination in step S1507, when the decided address information of the sub line overlaps with the address information of the main line, the network setting module 303 displays a message 1601 in FIG. 16 indicating this effect on the operating unit 113 (step S1510). The network setting module 303 then disconnects the communication connection with the access point 105 (step S1511). Namely, in the present embodiment, when the address information of the sub line overlaps with the address information of the main line, the sub line is disabled. Thereafter, the network setting module 303 terminates the present process.

According to the above described process in FIG. 15, when the address information of the sub line overlaps with the address information of the main line, the sub line is disabled. Namely, when the MFP 101 is accessed by a communication apparatus, it is not necessary to identify a line for communicating with the communication apparatus between the main line and the sub line. As a result, even if the same address information is set for the main line and the sub line, it is possible to easily identify a line to be used.

Moreover, according to the above described process in FIG. 15, when the wireless infrastructure is used as the sub line and the address information of the sub line overlaps with the address information of the main line, the communication connection with the access point 105 used in the sub line is disconnected. As a result, it is possible to surely exclude the sub line from candidates when a line for communicating with a communication apparatus which has accessed to the MFP 101 is identified.

Furthermore, according to the above described process in FIG. 15, the main line uses the default gateway. Consequently, a variety of networks including an external network other than the network set in advance can be constructed. As a result, even if the sub line is disabled, it is possible to surely communicate with a communication apparatus which has accessed to the MFP 101 by using the variety of networks.

According to the above described process in FIG. 15, the function of the sub line is more limited than that of the main line, and the sub line does not use the default gateway which is used in the main line. As a result, it is possible to avoid a situation in which a line to be used cannot be identified under an environment where the main line by which communication through the variety of networks constructed by using the default gateway is performed and the sub line by which communication within a network set in advance is performed are used in different ways.

Also, according to the above described process in FIG. 15, when the sub line network address identified based on the address information of the sub line matches with the main line network address identified based on the address information of the main line, or when one of the sub line network address and the main line network address is included in the other network address, it is determined that the address information of the sub line overlaps with the address information of the main line. As a result, it is possible to easily determine whether the address information of the sub line overlaps with the address information of the main line.

In addition, according to the above described process in FIG. 15, when the address information of the sub line overlaps with the address information of the main line, a message indicating that the address information overlaps is notified to the user. As a result, it is possible to let the user know that a defect of overlapping the address information occurs.

Figure 17:
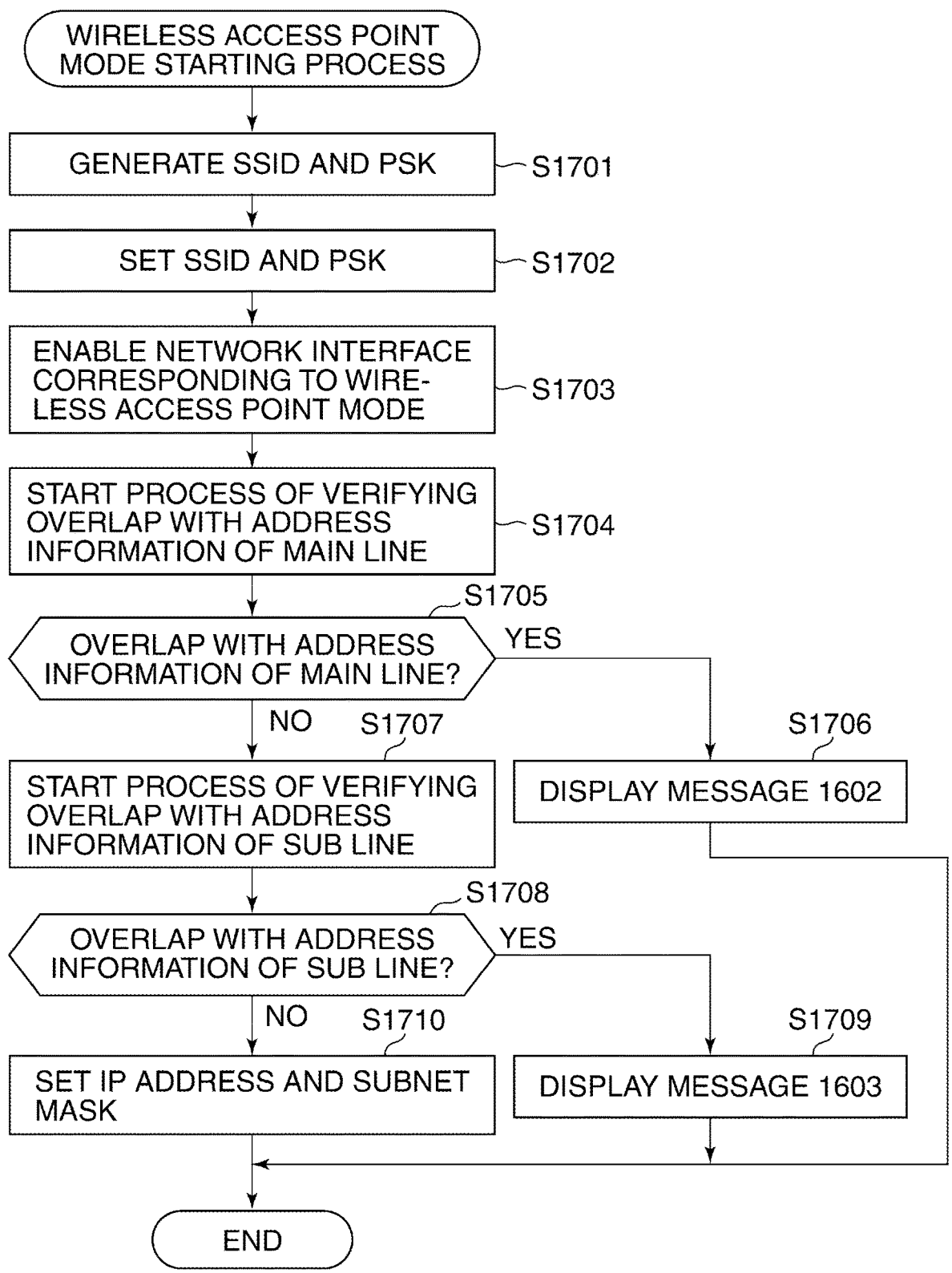
FIG. 17 is a flowchart showing a procedure of a wireless access point mode starting process carried out by the network setting module appearing in FIG. 3.

FIG. 17 is a flowchart showing a procedure of the wireless access point mode starting process carried out by the network setting module 303 appearing in FIG. 3.

The process in FIG. 17 is carried out by the CPU 201 implementing a program stored in the HDD 205, and carried out when the user selects the start button 501 on the start setting screen 500. In the process in FIG. 17, it is assumed that address information for the wireless access point mode, specifically, an IP address and a subnet mask are allocated in advance.

In FIG. 17, the network setting module 303 requests the WPA control module 306 to generate an SSID and a PSK of the MFP 101 as an access point (step S1701). The network setting module 303 then requests the WPA control module 306 to set the SSID and the PSK (step s1702). The network setting module 303 requests the WPA control module 306 to enable a network interface, not shown, corresponding to the wireless access point mode (step S1703). The network setting module 303 then starts a process of verifying overlap between the address information for the wireless access point mode and the address information of the main line (step S1704). The network setting module 303 determines whether the address information for the wireless access point mode overlaps with the address information of the main line (step S1705). In step S1705, a wireless access point mode network address identified by an IP address and a subnet mask in the address information for the wireless access point mode and the above described main line network address are compared with each other. In step S1705, the determination is performed based on the same determination reference as that in step S1507.

As a result of the determination in step S1705, when the address information for the wireless access point mode overlaps with the address information of the main line, the network setting module 303 displays a message 1602 in FIG. 16 indicating this effect on the operating unit 113 (step S1706). Thereafter, the network setting module 303 terminates the present process.

As a result of the determination in step S1705, when the address information for the wireless access point mode does not overlap with the address information of the main line, the network setting module 303 starts a process of verifying overlap between the address information for the wireless access point mode and the address information of the sub line (step S1707). The network setting module 303 determines whether the address information for the wireless access point mode overlaps with the address information of the sub line (step S1708). In step S1708, the above described wireless access point mode network address and the above described sub line network address are compared with each other, and the determination is performed based on the same determination reference as that in steps S1507 and S1705.

As a result of the determination in step S1708, when the address information for the wireless access point mode overlaps with the address information of the sub line, the network setting module 303 displays a message 1603 in FIG. 16 indicating this effect on the operating unit 113 (step S1709). Thereafter, the network setting module 303 terminates the present process.

As a result of the determination in step S1708, when the address information for the wireless access point mode does not overlap with the address information of the sub line, the network setting module 303 sets the address information for the wireless access point mode. Specifically, the network setting module 303 sets an IP address and a subnet mask in the address information for the wireless access point mode to the TCP/IP control module 305 (step S1710). As a result, the MFP 101 can perform the Wireless Direct. Thereafter, the network setting module 303 terminates the present process.

Figure 18:
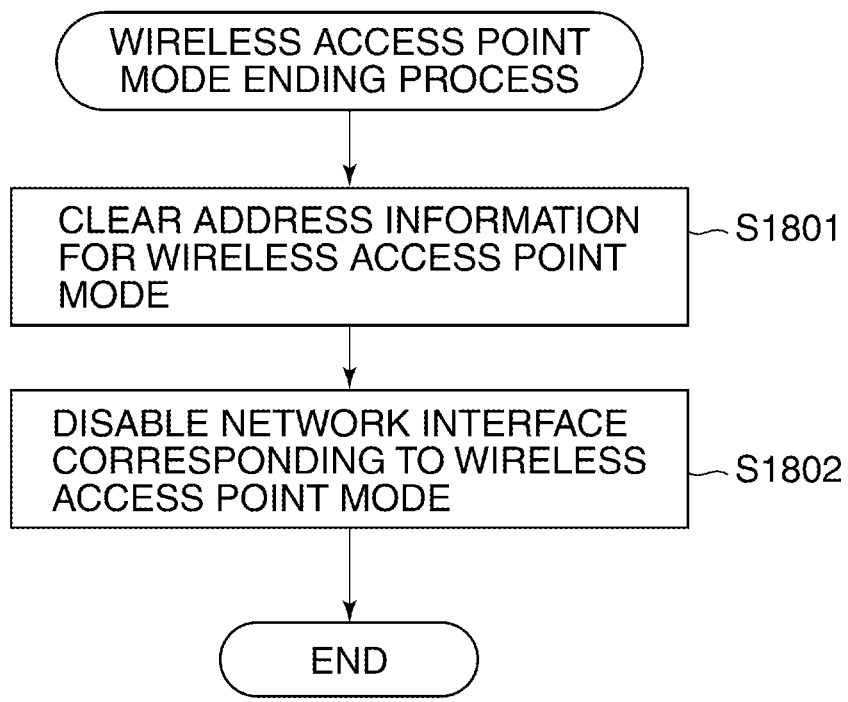
FIG. 18 is a flowchart showing a procedure of a wireless access point mode ending process carried out by the network setting module appearing in FIG. 3.

FIG. 18 is a flowchart showing a procedure of a wireless access point mode ending process carried out by the network setting module 303 appearing in FIG. 3.

The process in FIG. 18 is carried out by the CPU 201 implementing a program stored in the HDD 205. The process in FIG. 18 is also carried out when the user selects the end button 503 on the setting information screen 502 while the MFP 101 is in the wireless access point mode.

In FIG. 18, the network setting module 303 clears address information for the set wireless access point mode, specifically, the IP address and the subnet mask for the wireless access point mode (step S1801). The network setting module 303 then requests the WPA control module 306 to disable a network interface, not shown, corresponding to the wireless access point mode (step S1802). Subsequently, the network setting module 303 terminates the present process.

In the description above, although the present invention is explained using the above embodiment, the present invention is not limited to the above embodiment. For example, a control may be provided not to accept a starting instruction for the Wireless Direct in the wireless access point mode when the address information for the wireless access point mode overlaps with the address information of either of the main line or the sub line.

Figure 19:
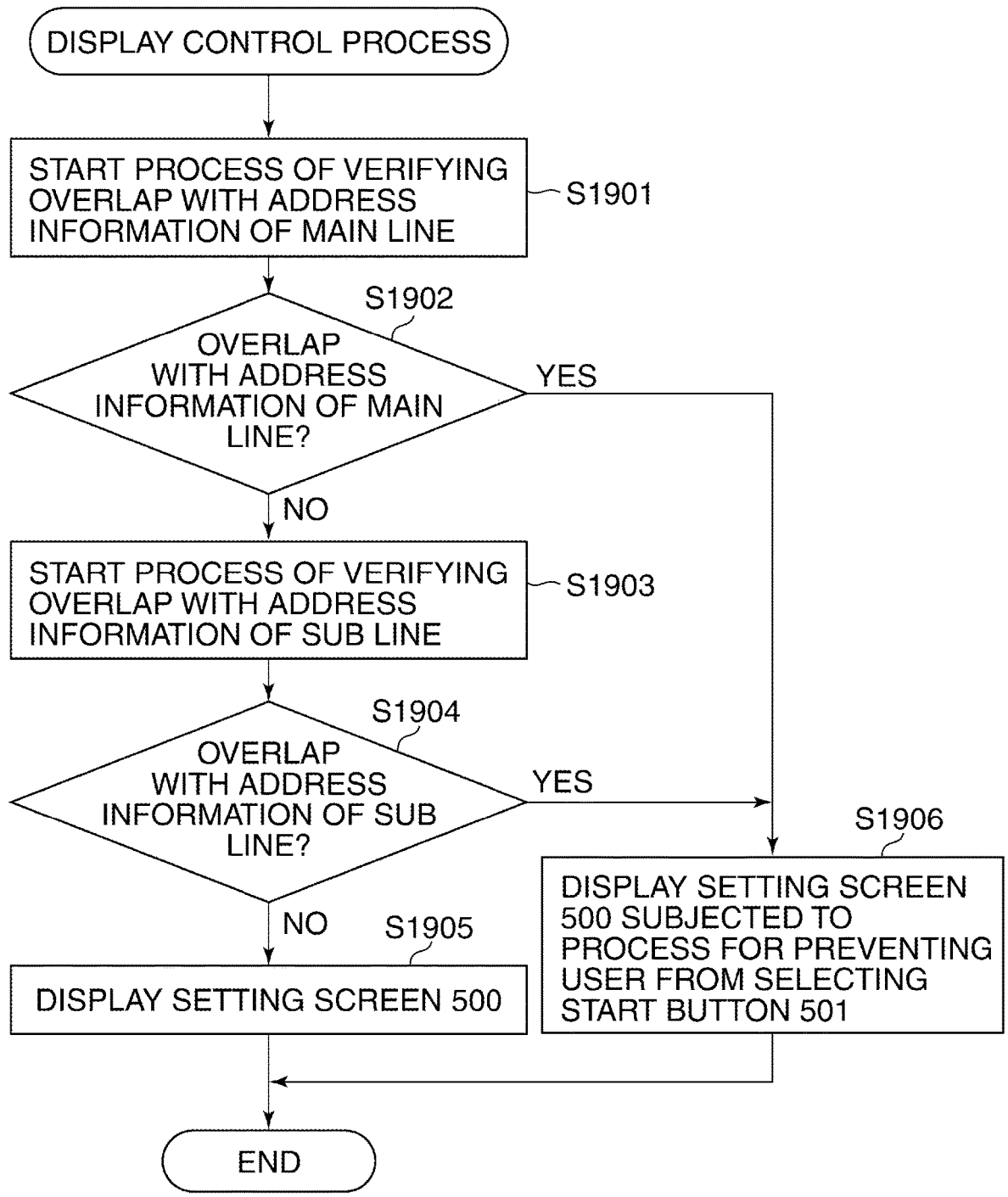
FIG. 19 is a flowchart showing a procedure of a display control process carried out by the network setting module appearing in FIG. 3.

FIG. 19 is a flowchart showing a procedure of a display control process carried out by the network setting module 303 appearing in FIG. 3.

The process in FIG. 19 is carried out by the CPU 201 implementing a program stored in the HDD 205. The process in FIG. 19 is also carried out when, on the menu screen 400, the user selects the wireless access point button 405 for displaying the start setting screen 500 through which a starting instruction of the Wireless Direct in the wireless access point mode is issued. In the process in FIG. 19 as well, it is assumed that the address information for the wireless access point mode is allocated in advance in the MFP 101.

In FIG. 19, the network setting module 303 starts a process of verifying overlap between the address information for the wireless access point mode and the address information of the main line (step S1901). The network setting module 303 determines whether the address information for the wireless access point mode overlaps with the address information of the main line (step S1902).

As a result of the determination in step S1902, when the address information for the wireless access point mode does not overlap with the address information of the main line, the network setting module 303 starts a process of verifying overlap between the address information for the wireless access point mode and the address information of the sub line (step S1903). The network setting module 303 determines whether the address information for the wireless access point mode overlaps with the address information of the sub line (step S1904).

As a result of the determination in step S1904, when the address information for the wireless access point mode does not overlap with the address information of the sub line, the network setting module 303 displays the start setting screen 500 on the operating unit 113 (step S1905). Thereafter, the network setting module 303 terminates the present process.

When the address information for the wireless access point mode overlaps with the address information of the main line as a result of the determination in step S1902, or when the address information for the wireless access point mode overlaps with the address information of the sub line as a result of the determination in step S1904, the network setting module 303 displays the start setting screen 500 subjected to a process for preventing the user from selecting the start button 501 on the operating unit 113 (step S1906). In step S1906, the start button 501 is displayed in an unselectable manner or is not displayed. Thereafter, the network setting module 303 terminates the present process.

In the above described process in FIG. 19, when the address information for the wireless access point mode overlaps with the address information of the main line, a control is provided so that the start button 501 for instructing a start of the wireless access point mode is not selected. As a result, it is possible to obviate a situation where the communication accesses to the MFP 101 by designating the address information for the wireless access point mode which overlaps with the address information of the main line, and hence a line for communicating with the communication apparatus cannot be identified.

In the above described embodiment, when the address information of the sub line input by the user on the sub line setting screen 1000 overlaps with the address information of the main line, an error message may be displayed on the operating unit 113 before the input address information of the sub line is reflected.

Figure 20:
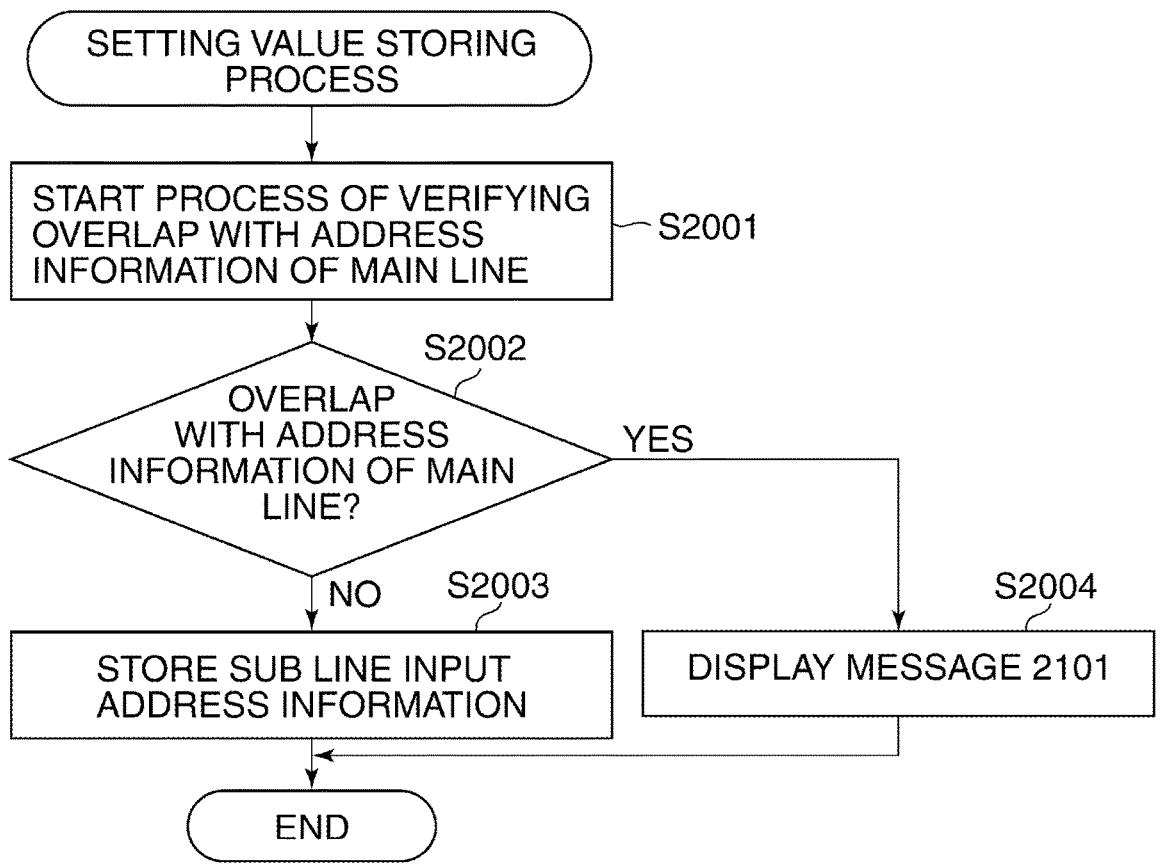
FIG. 20 is a flowchart showing a procedure of a setting value storing process carried out by the network setting module appearing in FIG. 3.

FIG. 20 is a flowchart showing a procedure of a setting value storing process carried out by the network setting module 303 appearing in FIG. 3.

The process in FIG. 20 is carried out by the CPU 201 implementing a program stored in the HDD 205. The process in FIG. 20 is also carried out when the user selects the OK button 1004 on the sub line setting screen 1000.

In FIG. 20, the network setting module 303 starts a process of verifying overlap between the address information of the sub line (hereinafter, referred to as "the sub line input address information") input on the sub line setting screen 1000 and the address information of the main line (step S2001). The network setting module 303 determines whether the sub line input address information overlaps with the address information of the main line (step S2002).

As a result of the determination in step S2002, when the sub line input address information does not overlap with the address information of the main line, the network setting module 303 stores the sub line input address information into the HDD 205 (step S2003). Specifically, the network setting module 303 stores an IP address input in the IP address input section 1001 of the sub line setting screen 1000 and a subnet mask input in the sub net mask input section 1002 of the sub line setting screen 1000 into the HDD 205. Thereafter, the network setting module 303 terminates the present process.

Figure 21:
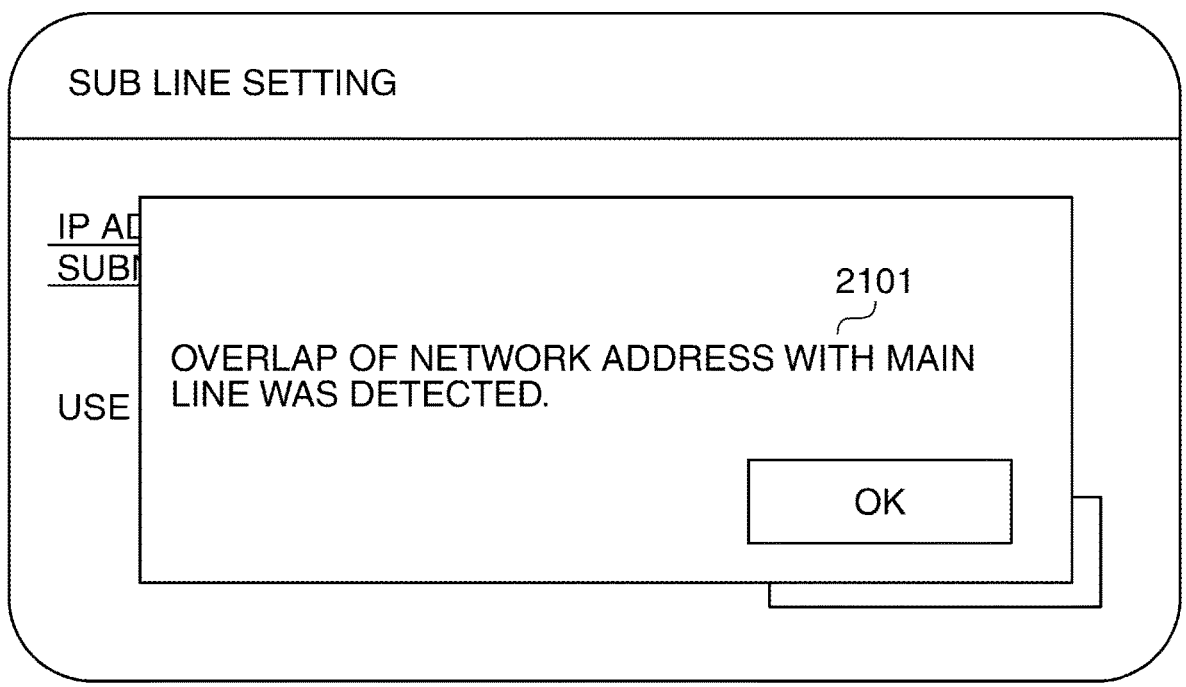
FIG. 21 is a view showing examples displayed on the operating unit appearing in FIG. 1.

As a result of the determination in S2002, when the sub line input address information overlaps with the address information of the main line, the network setting module 303 displays a message 2101 in FIG. 21 indicating this effect on the operating unit 113 (step S2004). Thereafter, the network setting module 303 terminates the present process.

In the above described embodiment, as a result of the determination in step S1507 in FIG. 15, the IP address included in the address information of the sub line may be obtained again when the decided address information of the sub line overlaps with the address information of the main line.

Figure 22:
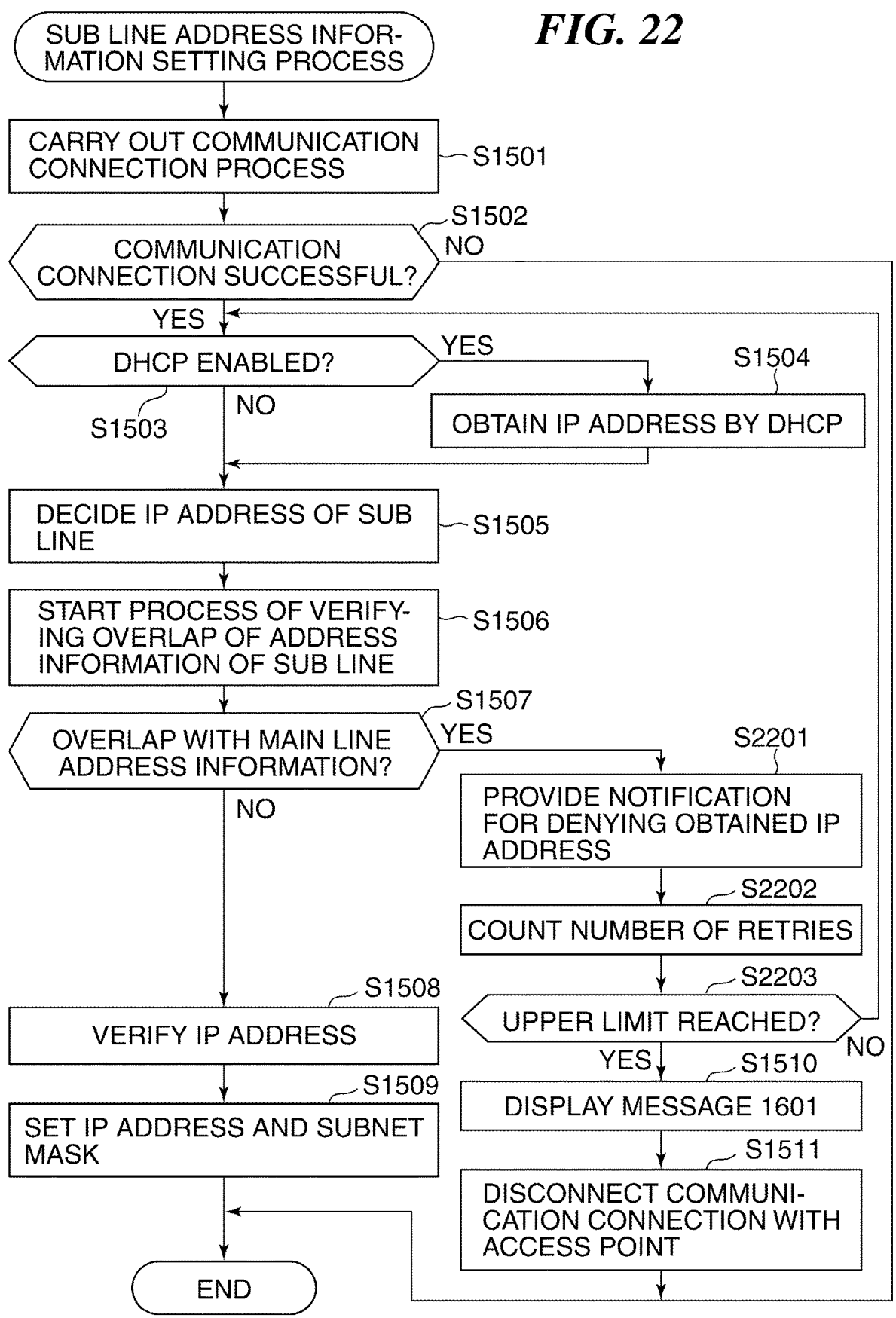
FIG. 22 is a flowchart showing a procedure of a variation of the sub line address information setting process in FIG. 15.

FIG. 22 is a flowchart showing a procedure of a variation of the sub line address information setting process in FIG. 15.

The process in FIG. 22 is also carried out by the CPU 201 implementing a program stored in the HDD 205, and carried out when the setting value indicating that the "wired (main)+wireless (sub)" 803 was selected and the above described process in FIG. 14 was terminated. It should be noted that in the process in FIG. 22, when the decided address information of the sub line overlaps with the address information of the main line as a result of the determination in step S1507 in FIG. 15, another process is carried out. Therefore, only a description of a process different from that in the process in the FIG. 15 will be explained hereinafter.

As a result of the determination in step S1507, when the decided address information of the sub line overlaps with the address information of the main line, the network setting module 303 provides a notification saying not to accept the obtained IP address to the DSCP server to which the network setting module 303 accessed in step S1504 (step S2201). Specifically, the network setting module 303 sends a DHCP-DECLINE to the DHCP server in accordance with the DHCP protocol and provides a notification saying not to use the IP address allocated by the DHCP server. The network setting module 303 then counts the number of retries (step S2202). Specifically, the network setting module 303 increments the number of retries set in advance in the data storage module 302. Then, the network setting module 303 determines whether the number of retries has reached an upper limit (step S2203). In step S2203, when the number of retries has reached a threshold value set in advance, the network setting module 303 determines that the number of retries has reached the upper limit. On the other hand, when the number of retries has not reached the threshold value, the network setting module 303 determines that the number of retries has not reached the upper limit.

As a result of the determination in step S2203, when the number of retries has not reached the upper limit, the process returns to step S1503. On the other hand, as a result of the determination in step S2203, when the number of retries has reached the upper limit, the network setting module 303 carries out the processes in step S1510 and subsequent steps.

In the above described process in FIG. 22, when the address information of the sub line overlaps with the address information of the main line, the MFP 101 obtains address information of the sub line again. As a result, it is possible to prevent a situation where the address information of the sub line which overlaps with the address information of the main line is set.

It should be noted that in the embodiment described above, a name of the main line may be replaced with a name such as a primary line and a priority line, and a name of the sub line may be replaced with a name such as a secondary line and an auxiliary line.

Moreover, in the present embodiment described above, a name of the line may be replaced with a name such as an infrastructure.

Furthermore, in the present embodiment described above, a configuration which realizes a plurality of lines by using a physically different plurality of network interfaces was explained. However, a configuration which realizes a plurality of logical lines by using a single network interface may be applied to the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-137595, filed Jul. 14, 2017, which is hereby incorporated by reference herein in its entirety.

What is claimed is:

1. An image processing apparatus having a wired interface and a wireless interface, and the image processing apparatus being capable of transmitting data to an external device via the wired interface or the wireless interface, wherein the wireless interface connects to an external access point and communicates with the external device via a network provided by the external access point, the image processing apparatus comprising:
- at least one processor; and
- at least one memory storing instructions that, when executed by the at least one processor, cause the image processing apparatus to:
  - determine whether a network part of an IP address assigned to the wired interface matches with a network part of an IP address assigned to the wireless interface;
  - disconnect a communication connection between the external access point and the image processing apparatus, according to a determination that the network part of the IP address assigned to the wired interface matches with the network part of the IP address assigned to the wireless interface; and
  - disable the wireless interface according to the determination that the network part of the IP address assigned to the wired interface matches with the network part of the IP address assigned to the wireless interface,
  - wherein the wired interface serves as an interface that outputs, to an external device via a default gateway, data to be transmitted.

2. The image processing apparatus according to claim 1, wherein the at least one processor further executes instructions stored in the at least one memory to cause the image processing apparatus to:
- prohibit the image processing apparatus from operating in a state where a direct wireless communication function by using the wireless interface, by which direct wireless communication is performed with the external device without using an external access point, is enabled, in a case where a network part of an IP address to be used for the direct wireless communication function matches with either of the network part of the IP address assigned to the wired interface or the network part of the IP address assigned to the wireless interface.

3. The image processing apparatus according to claim 1, wherein the wired interface is used as an interface having a higher priority than a priority of the wireless interface.

4. The image processing apparatus according to claim 1, wherein the at least one processor further executes instructions stored in the at least one memory to provide a predetermined error message to a user in a case where the network part of the IP address assigned to the wired interface matches with the network part of the IP address assigned to the wireless interface.

5. The image processing apparatus according to claim 4, wherein the predetermined error message is a message for notifying the user of an occurrence of network error.

6. The image processing apparatus according to claim 1, further comprising a printing device.

7. A control method for an image processing apparatus having a wired interface and a wireless interface, and the image processing apparatus being capable of transmitting data to an external device via the wired interface or the wireless interface, wherein the wireless interface connects to an external access point and communicates with the external device via a network provided by the external access point, the control method, comprising:
- determining whether a network part of an IP address assigned to the wired interface matches with a network part of an IP address assigned to the wireless interface;
- disconnecting a communication connection between the external access point and the image processing apparatus, according to a determination that the network part of the IP address assigned to the wired interface matches with the network part of the IP address assigned to the wireless interface; and
- disabling the wireless interface according to the determination that the network part of the IP address assigned to the wired interface matches with the network part of the IP address assigned to the wireless interface,
- wherein the wired interface serves as an interface that outputs, to an external device via a default gateway, data to be transmitted.

8. A non-transitory computer-readable storage medium storing a program for causing a computer to execute a control method for an image processing apparatus having a wired interface and a wireless interface, and the image processing apparatus being capable of transmitting data to an external device via the wired interface or the wireless interface, wherein the wireless interface connects to an external access point and communicates with the external device via a network provided by the external access point, the control method, comprising:
- determining whether a network part of an IP address assigned to the wired interface matches with a network part of an IP address assigned to the wireless interface;
- disconnecting a communication connection between the external access point and the image processing apparatus, according to a determination that the network part of the IP address assigned to the wired interface matches with the network part of the IP address assigned to the wireless interface; and
- disabling the wireless interface according to the determination that the network part of the IP address assigned to the wired interface matches with the network part of the IP address assigned to the wireless interface,
- wherein the wired interface serves as an interface that outputs, to an external device via a default gateway, data to be transmitted.

9. An image processing apparatus comprising:
- a first network interface;
- a second network interface different from the first network interface, wherein one of the first network interface and the second network interface is used as an interface having a higher priority and the other of the first network interface and the second network interface is used as an interface having a lower priority than the interface having the higher priority, and the image processing apparatus is capable of transmitting data, which is obtained by a scanner reading an original, to an external device via the first network interface or the second network interface;
- at least one processor; and
- at least one memory storing instructions that, when executed by the at least one processor, cause the image processing apparatus to:
  - determine whether a network part of an IP address assigned to a network interface to be used as the interface having the lower priority matches with a network part of an IP address assigned to the network interface to be used as the the interface having the higher priority;
  - disconnect a communication connection already-established between the interface having the lower priority and an external network, according to a determination that the network part of the IP address assigned to the network interface to be used as the interface having the lower priority matches with the network part of the IP address assigned to the network interface to be used as the interface having the higher priority; and disable the network interface to be used as the interface having the lower priority, according to the determination that the network part of the IP address assigned to the network interface to be used as the interface having the lower priority matches with the network part of the IP address assigned to the network interface to be used as the the interface having the higher priority, wherein the network interface to be used as the the interface having the higher priority serves as a network interface that outputs, to an external device via a default gateway, data to be transmitted.

10. The image processing apparatus according to claim 9, wherein the at least one processor further executes instructions stored in the at least one memory to provide a predetermined error message to a user in a case where the network part of the IP address assigned to the network interface to be used as the interface having the lower priority matches with the network part of the IP address assigned to the network interface to be used as the the interface having the higher priority.

11. The image processing apparatus according to claim 10, wherein the predetermined error message is a message for notifying the user of an occurrence of network error.

12. The image processing apparatus according to claim 9, further comprising a printing device.

13. The image processing apparatus according to claim 9, wherein the first network interface is a wired network interface that transmits data via a cable and the second network interface is a wireless network interface for executing wireless communication via a wireless network provided by an access point.

* * * * *